US008687283B2

(12) United States Patent  
Wada

(10) Patent No.: US 8,687,283 B2  
(45) Date of Patent: Apr. 1, 2014

(54) ZOOM LENS AND IMAGE PICKUP APPARATUS HAVING THE SAME

(71) Applicant: Canon Kabushiki Kaisha, Tokyo (JP)

(72) Inventor: Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/657,688

(22) Filed: Oct. 22, 2012

(65) Prior Publication Data

US 2013/0100325 A1 Apr. 25, 2013

(30) Foreign Application Priority Data

Oct. 24, 2011 (JP) ................................. 2011-232757

(51) Int. Cl.
*G02B 15/14* (2006.01)
*G02B 27/64* (2006.01)

(52) U.S. Cl.
USPC ............................ 359/683; 359/687; 359/557

(58) Field of Classification Search
CPC ....... G02B 15/14; G02B 15/16; G02B 15/173
USPC ........... 348/294, 340; 359/557, 676, 683, 687
See application file for complete search history.

(56) References Cited

U.S. PATENT DOCUMENTS

| 7,692,869 | B2 | 4/2010 | Yamaguchi et al. | |
|---|---|---|---|---|
| 8,179,608 | B2 * | 5/2012 | Wada et al. | 359/676 |
| 2012/0019929 | A1 * | 1/2012 | Fujisaki | 359/683 |
| 2013/0176479 | A1 * | 7/2013 | Wada | 348/345 |

FOREIGN PATENT DOCUMENTS

JP 2007293052 A 11/2007

* cited by examiner

*Primary Examiner* — David N Spector
(74) *Attorney, Agent, or Firm* — Canon USA Inc. IP Division

(57) ABSTRACT

A zoom lens includes, in order from an object side to an image side, a front lens group including a first lens unit having positive refractive power and a second lens unit having refractive power, and a rear lens group including a plurality of lens units. The second lens unit includes a reflective member configured to bend an optical path. At least the first lens unit and at least two lens units of the rear lens group move during zooming. The second lens unit does not move for zooming. A reflection unit including the reflective member moves perpendicularly to an optical axis of the front lens group during retraction. At least part of the front lens group is retractable into a space caused by movement of the reflection unit. A focal length f2 of the second lens unit and a focal length ft of the entire zoom lens at a telephoto end are appropriately set.

14 Claims, 18 Drawing Sheets

ZOOM LENS AND IMAGE PICKUP APPARATUS HAVING THE SAME

BACKGROUND OF THE INVENTION

1. Field of the Invention

The present invention relates to a zoom lens. More particularly, the invention relates to a photographic optical system used for an image pickup apparatus such as a video camera, a digital still camera, a broadcast camera, and a silver-halide film camera.

2. Description of the Related Art

A photographic optical system used for an image pickup apparatus is required to ensure a high zoom ratio, miniaturize the entire size, and particularly provide a zoom lens capable of reducing the camera thickness. A retractable zoom lens is known to miniaturize the camera size and ensure a high zoom ratio. During a non-photographing state, the retractable zoom lens retracts lens units into a camera body by reducing a distance between the lens units so that the reduced distance differs from the distance used for photographing. Additionally, an optical-path-bending zoom lens is known to reduce the camera thickness. The optical-path-bending zoom lens includes a reflective member in an optical path. The reflective member includes a reflecting prism that reflects an optical axis at 90 degrees in the photographic optical system.

Furthermore, a retractable optical-path-bending zoom lens is known as a combination of both systems. During the non-photographing state, the reflective member moves to leave a space to retract the lens unit located at the object side of the reflective member.

A retractable zoom lens may be provided with a reflective member that reflects the optical path of the photographic optical system. Such a retractable zoom lens can easily ensure a high zoom ratio and reduce the camera thickness if used for a camera. For achieving these effects, however, it is important to appropriately configure the zoom lens, the reflective member, and the arrangement in the optical path.

Zoom lenses discussed in U.S. Pat. No. 7,692,869 and Japanese Patent Application Laid-Open No. 2007-293052 include, in order from an object side to an image side, a first lens unit having positive refractive power, a second lens unit having negative refractive power, and a rear lens group including a plurality of lens units. The second lens unit contains the reflective member for reflecting the optical path. The second lens unit is fixed during zooming. During non-photographing, the reflective member and lens units located the image side thereof are moved toward the image plane. A space is thereby ensured and is used to store a lens unit located on the object side of the reflective member.

However, the zoom lenses discussed in U.S. Pat. No. 7,692,869 and Japanese Patent Application Laid-Open No. 2007-293052 provide the second lens unit with a low refractive power. Thus, zooming increases the amount of movement of the first lens unit, making it difficult to ensure a high zoom ratio. For ensuring a high zoom ratio and miniaturizing the entire camera, the retractable optical-path-bending zoom lens requires an appropriate lens configuration, such as the number of lens units, allocation of refractive powers to the lens units, and movement conditions of the lens units during zooming. Moreover, the reflective member needs to have an appropriate length in the optical axis direction and needs to be appropriately positioned in the optical path. These configurations need to be appropriately taken into consideration to achieve the above-mentioned effects.

SUMMARY OF THE INVENTION

The present invention is directed to a zoom lens and an image pickup apparatus equipped with the zoom lens, which are capable of ensuring a high zoom ratio, providing an excellent image, and reducing the thickness of a camera when the zoom lens and the image pickup apparatus are applied to the camera.

According to an aspect of the present invention, a zoom lens includes, in order from an object side to an image side, a front lens group, including a first lens unit having positive refractive power and a second lens unit having negative refractive power, and a rear lens group, including a plurality of lens units. The second lens unit includes a reflective member configured to bend an optical path. At least the first lens unit and at least two lens units of the rear lens group move during zooming. The second lens unit does not move for zooming. A reflection unit including the reflective member moves perpendicularly to an optical axis of the front lens group during retraction. At least part of the front lens group is retractable into a space caused by the movement of the reflection unit. The zoom lens satisfies the following condition:

$$12.0 < ft/|f2| < 30.0$$

where f2 denotes a focal length of the second lens unit and ft denotes a focal length of the entire zoom lens at a telephoto end.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A zoom lens according to an exemplary embodiment of the invention includes, in order from an object side to an image side, a front lens group, including a first lens unit having positive refractive power and a second lens unit having negative refractive power, and a rear lens group, including a plurality of lens units. The second lens unit includes a reflective member, such as a reflecting prism or a reflection mirror, configured to bend an optical path approximately at 90 degrees (within 90±10 degrees).

At least the first lens unit and at least two lens units of the rear lens group move during zooming. The second lens unit does not move for zooming. A reflection unit including the reflective member moves perpendicularly (within 90±10 degrees) to an optical path of the front lens group during retraction. At least part of the front lens group is retractable into a space caused by movement of the reflection unit.

Figure 1:
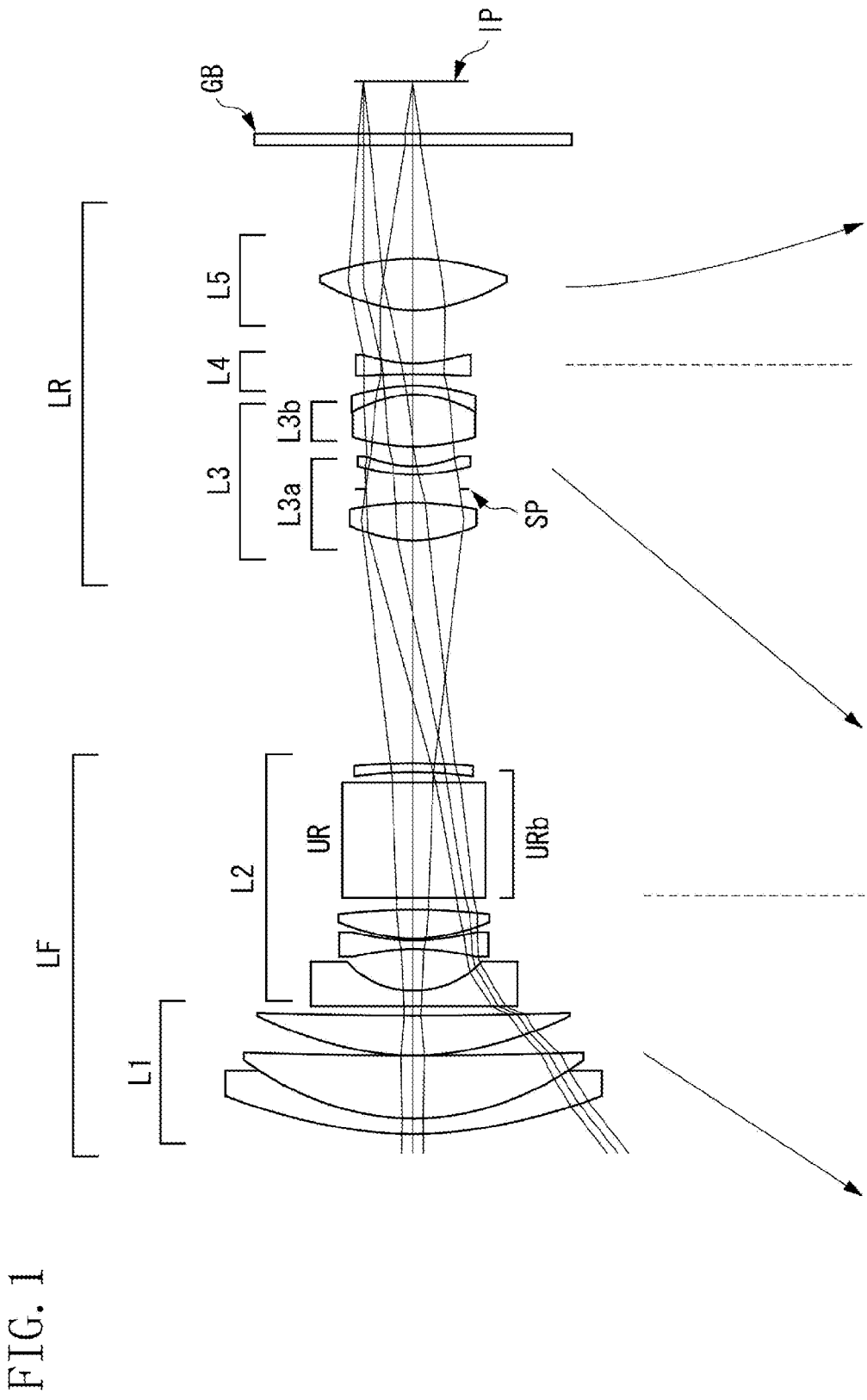
FIG. 1 is a sectional view of a zoom lens according to a first exemplary embodiment of the invention with an optical path exploded.
Figure 2A:
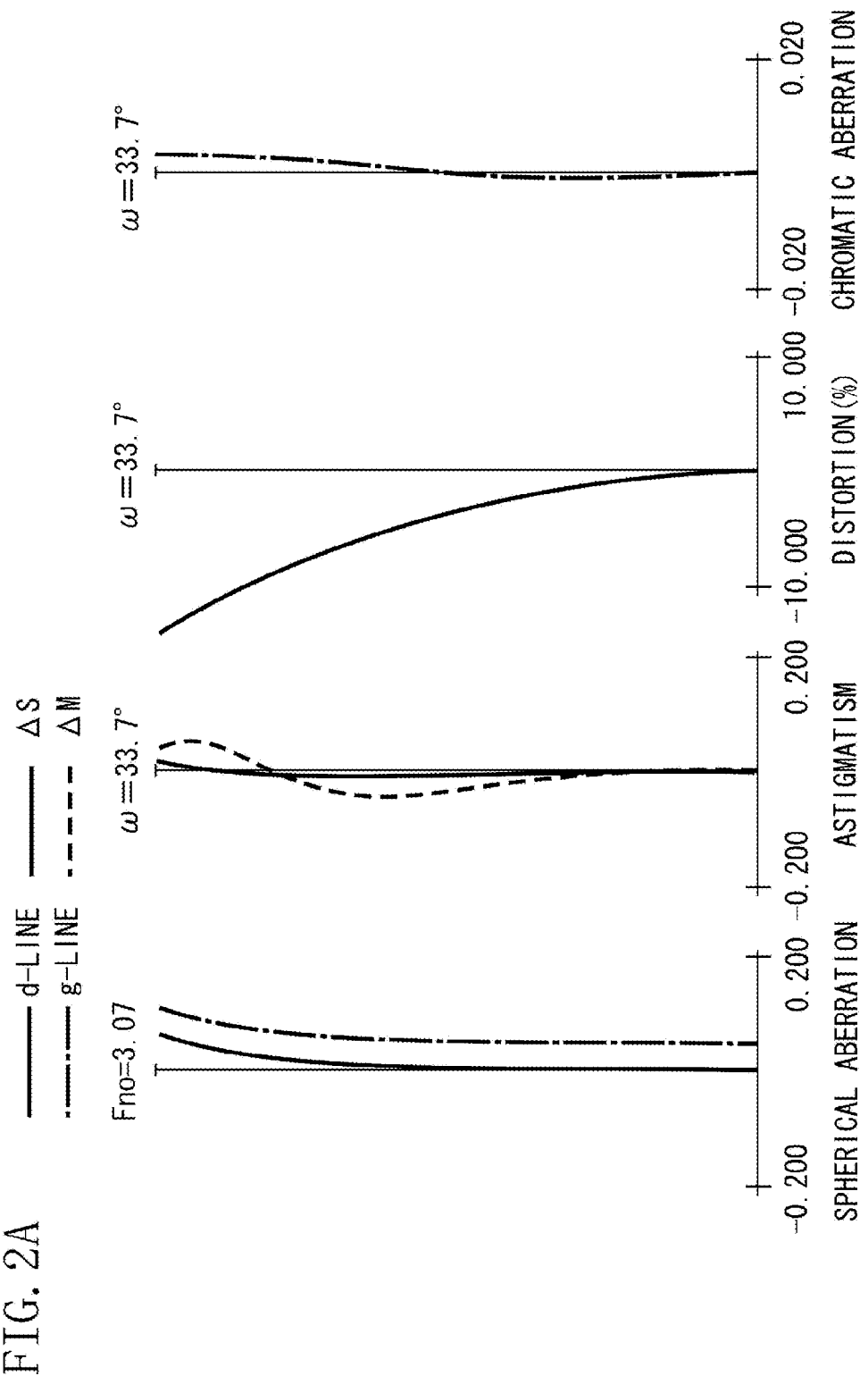
FIGS. 2A and 2B are aberration diagrams of the zoom lens at a wide-angle end and a telephoto end, respectively, according to the first exemplary embodiment.
Figure 2B:
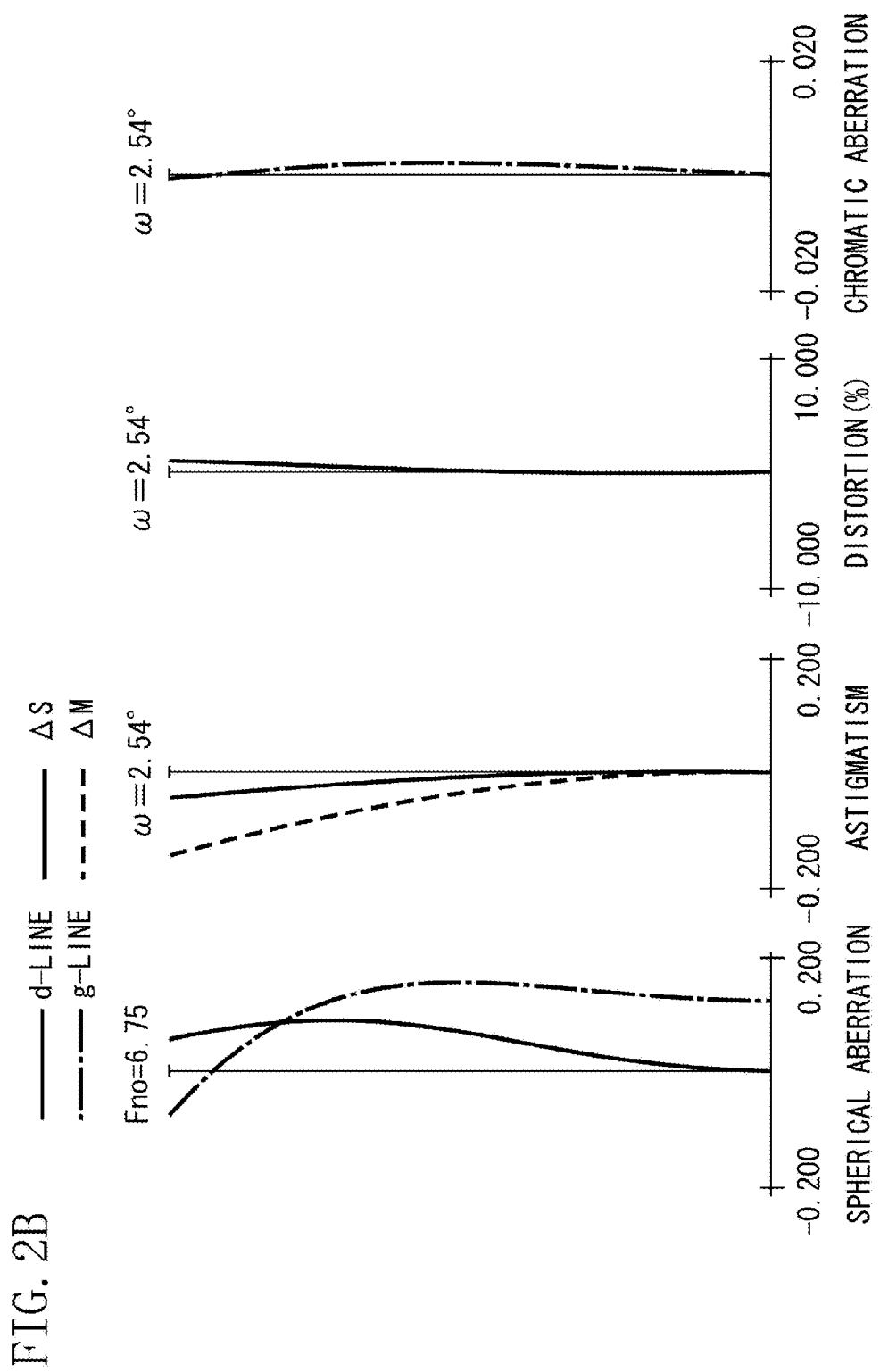
Figure 3:
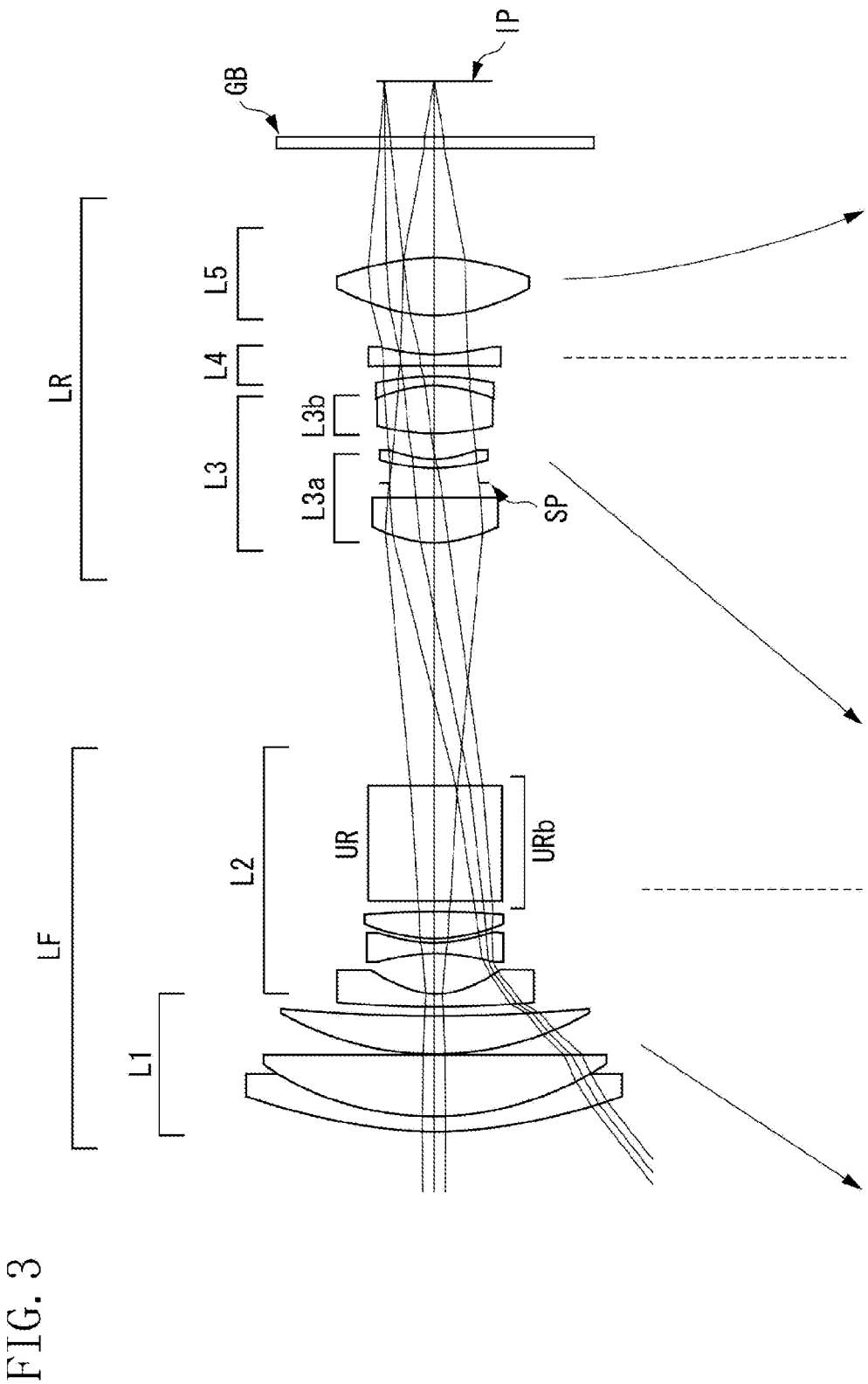
FIG. 3 is a sectional view of a zoom lens according to a second exemplary embodiment of the invention with an optical path exploded.
Figure 4A:
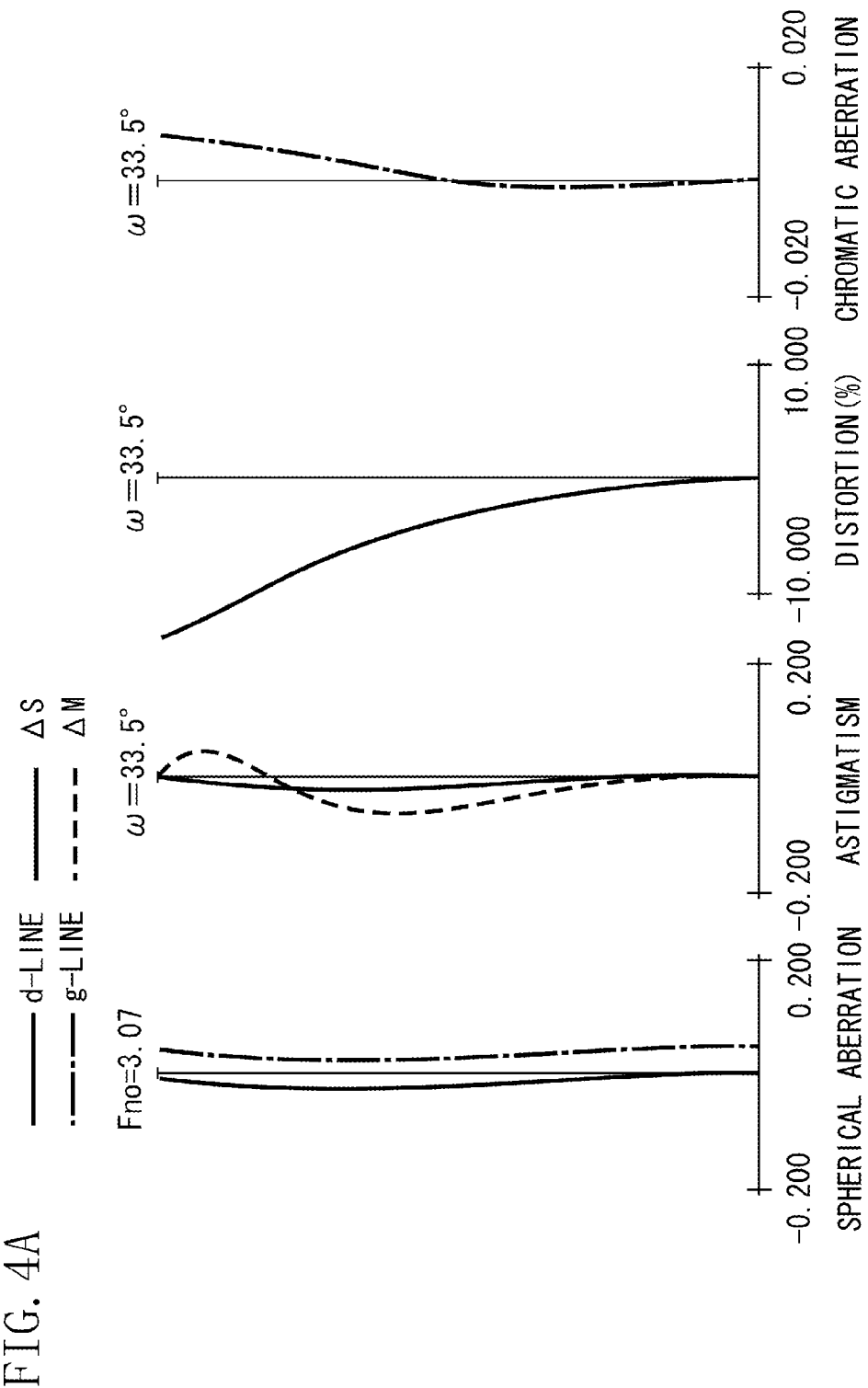
FIGS. 4A and 4B are aberration diagrams of the zoom lens at a wide-angle end and a telephoto end, respectively, according to the second exemplary embodiment of the invention.
Figure 4B:
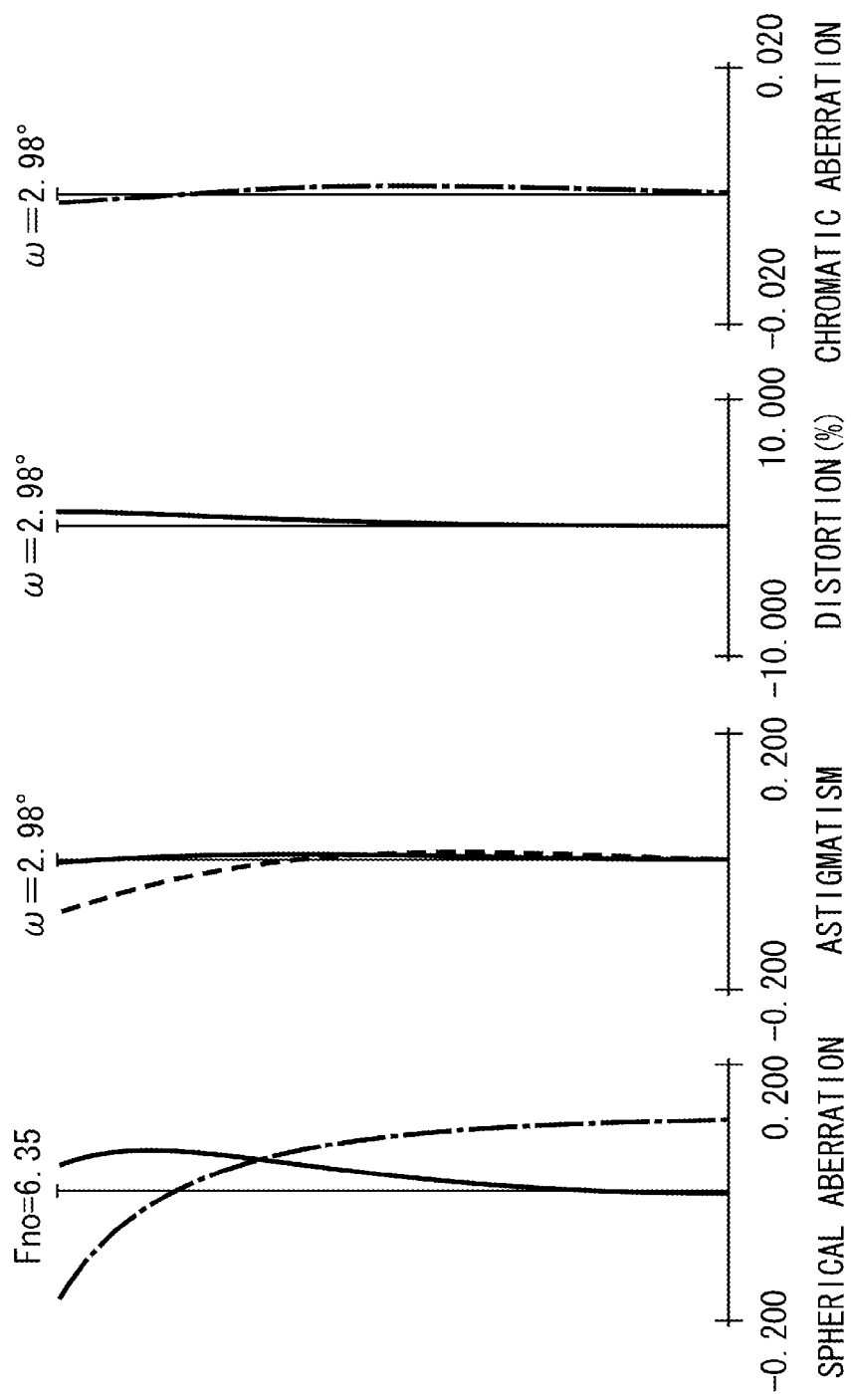

FIG. 1 is a sectional lens view of a zoom lens according to a first exemplary embodiment of the invention at a wide-angle end (short focal length end) with an optical path exploded. FIGS. 2A and 2B are aberration diagrams of the zoom lens according to the first exemplary embodiment at the wide-angle end and a telephoto end (long focal length end), respectively. FIG. 3 is a sectional lens view of a zoom lens according to a second exemplary embodiment of the invention at the wide-angle end with an optical path exploded. FIGS. 4A and 4B are aberration diagrams of the zoom lens according to the second exemplary embodiment of the invention at the wide-angle end and the telephoto end, respectively.

Figure 5:
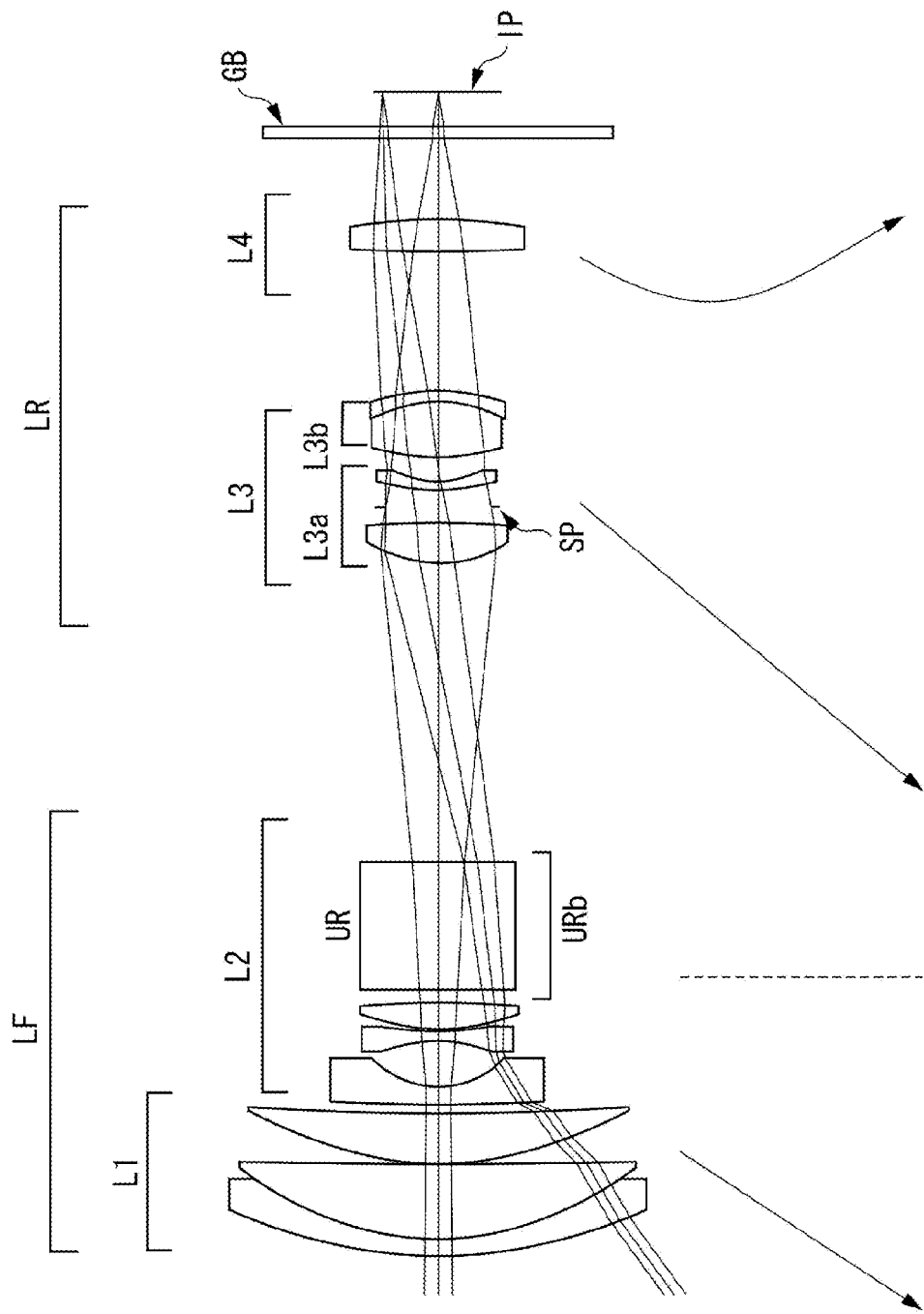
FIG. 5 is a sectional view of a zoom lens according to a third exemplary embodiment of the invention with an optical path exploded.
Figure 6A:
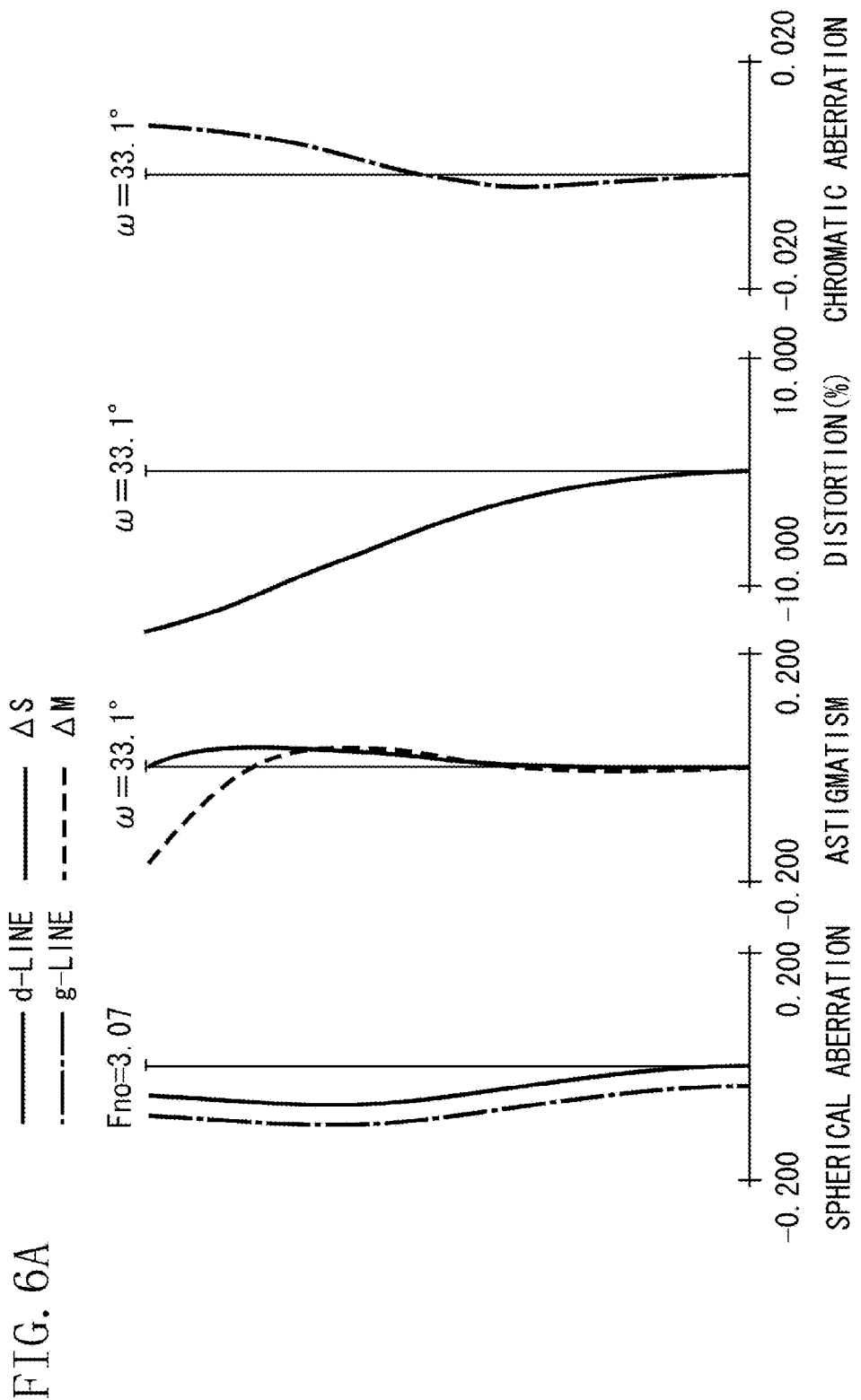
FIGS. 6A and 6B are aberration diagrams of the zoom lens at a wide-angle end and a telephoto end, respectively, according to the third exemplary embodiment of the invention.
Figure 6B:
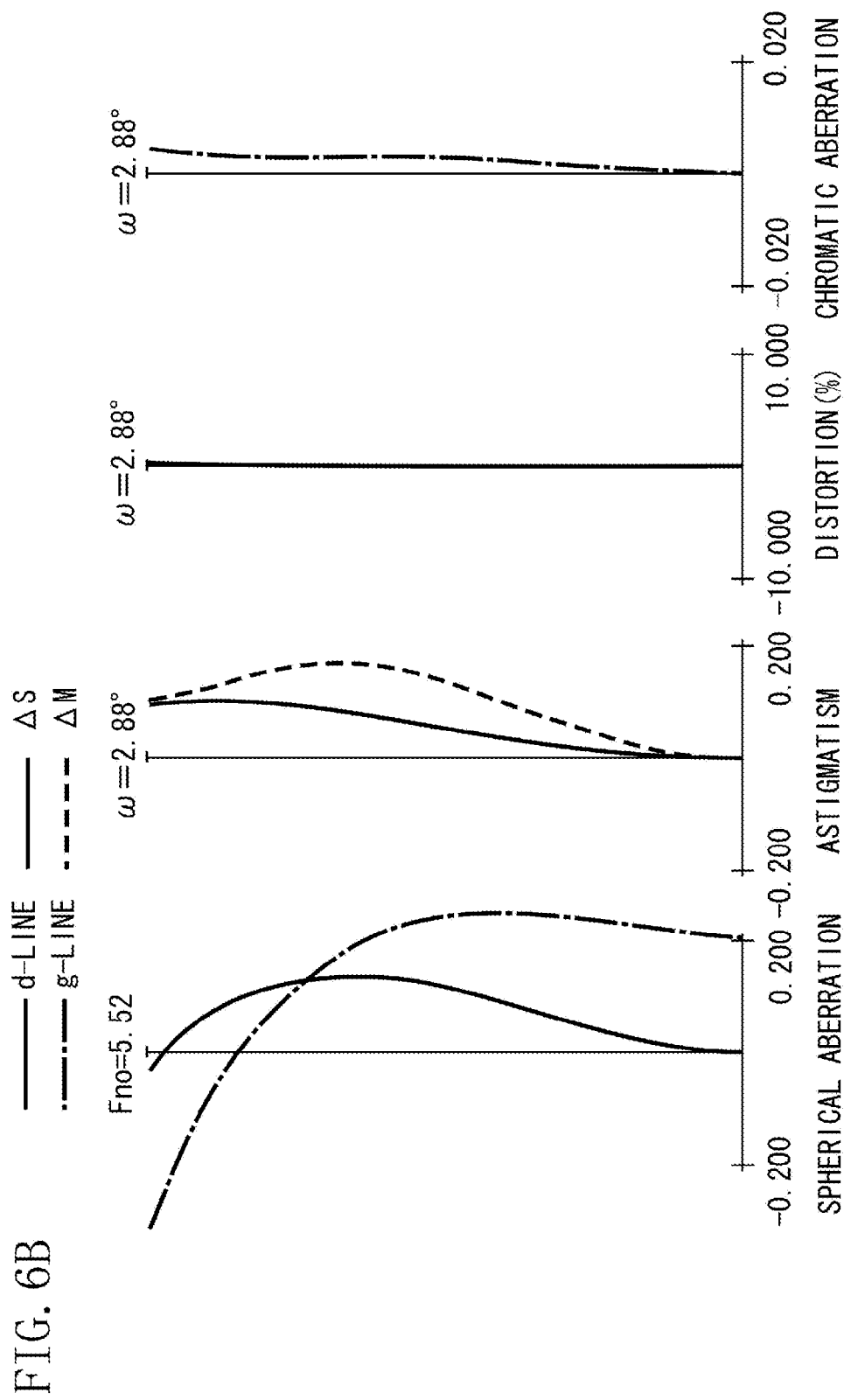
Figure 7:
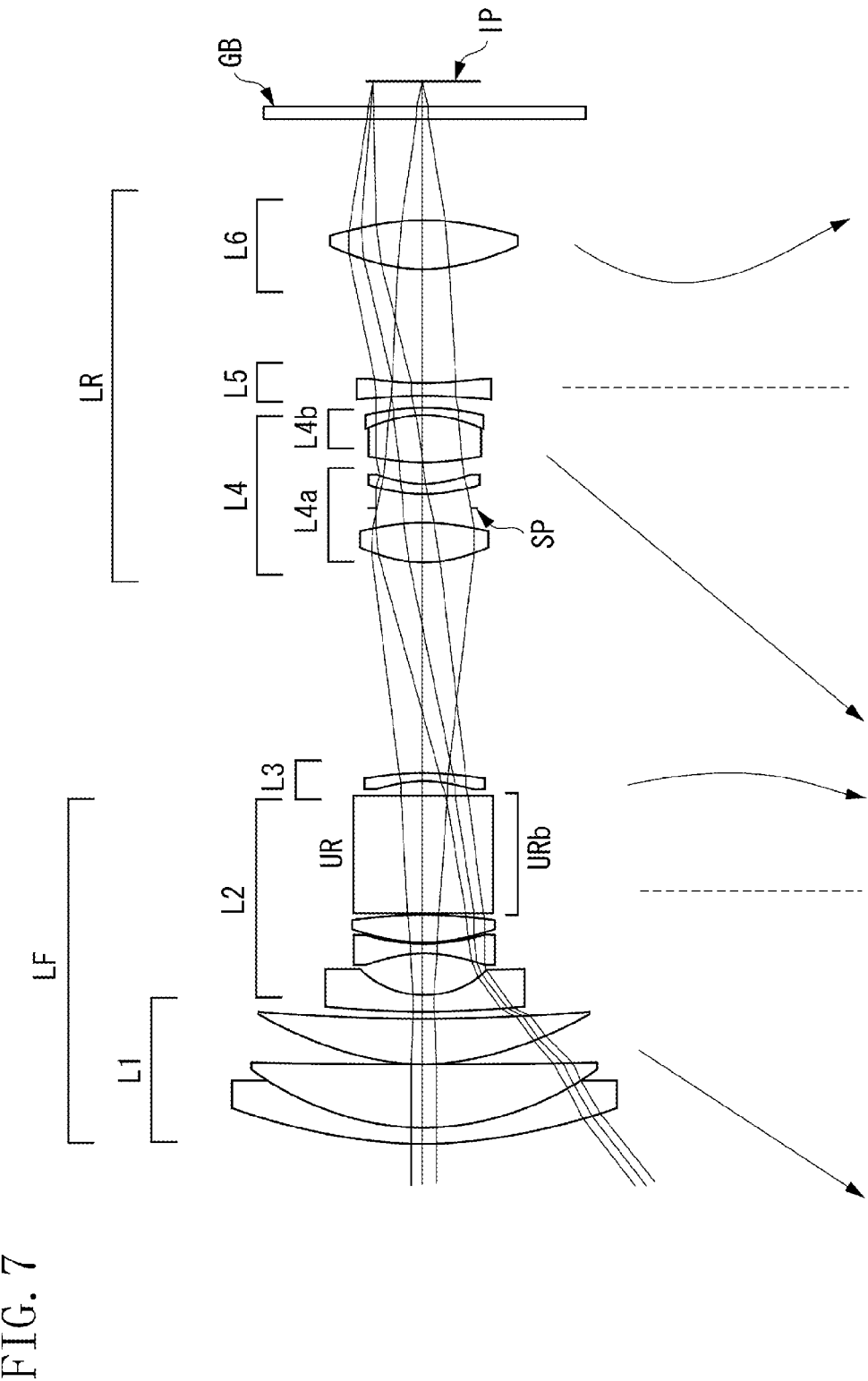
FIG. 7 is a sectional view of a zoom lens according to a fourth exemplary embodiment of the invention with an optical path exploded.
Figure 8A:
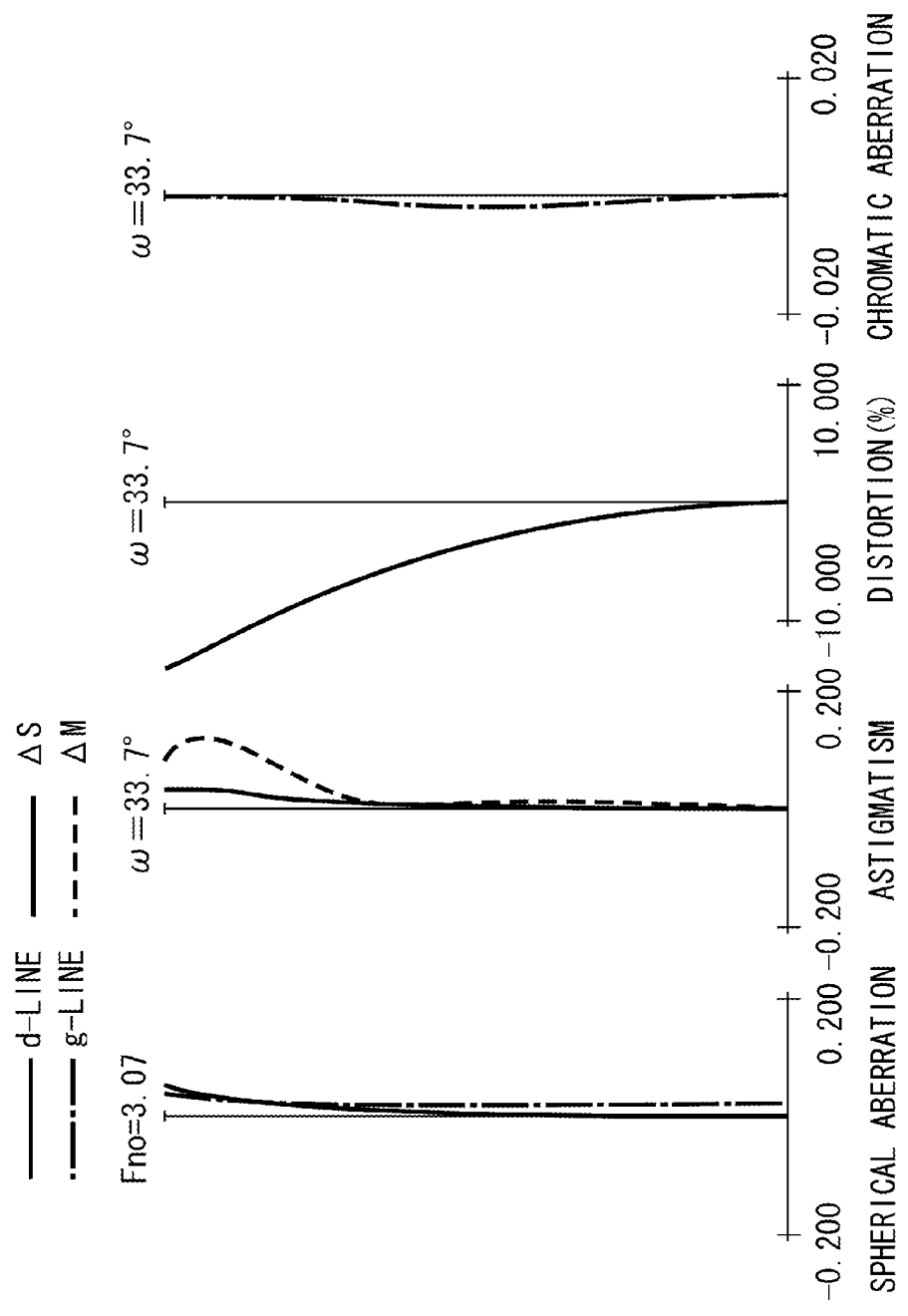
FIGS. 8A and 8B are aberration diagrams of the zoom lens at a wide-angle end and a telephoto end, respectively, according to the fourth exemplary embodiment of the invention.
Figure 8B:
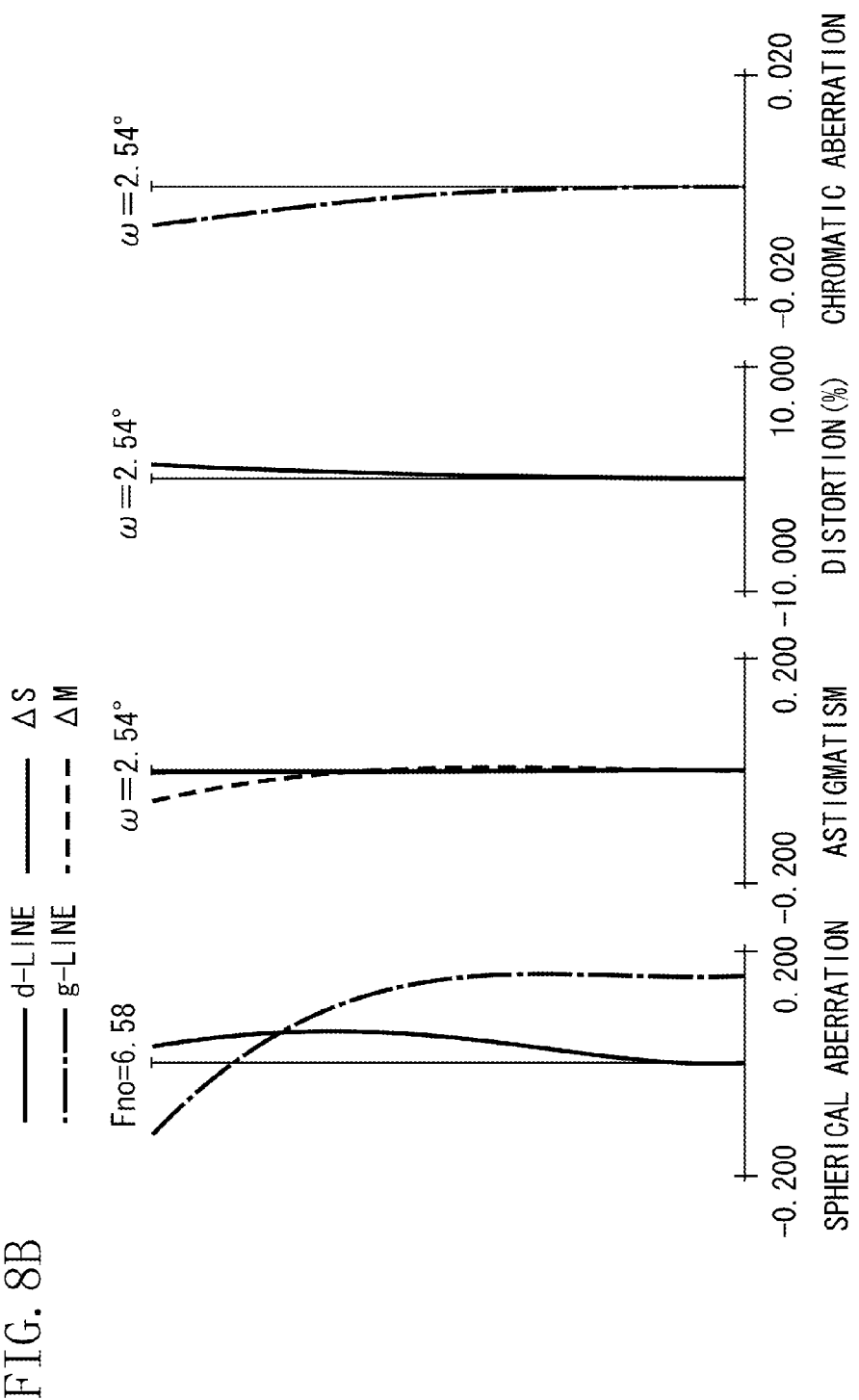

FIG. 5 is a sectional lens view of a zoom lens according to a third exemplary embodiment of the invention at the wide-angle end with an optical path exploded. FIGS. 6A and 6B are aberration diagrams of the zoom lens according to the third exemplary embodiment of the invention at the wide-angle end and the telephoto end, respectively. FIG. 7 is a sectional lens view of a zoom lens according to a fourth exemplary embodiment of the invention at the wide-angle end with an optical path exploded. FIGS. 8A and 8B are aberration diagrams of the zoom lens according to the fourth exemplary embodiment of the invention at the wide-angle end and the telephoto end, respectively.

Figure 9:
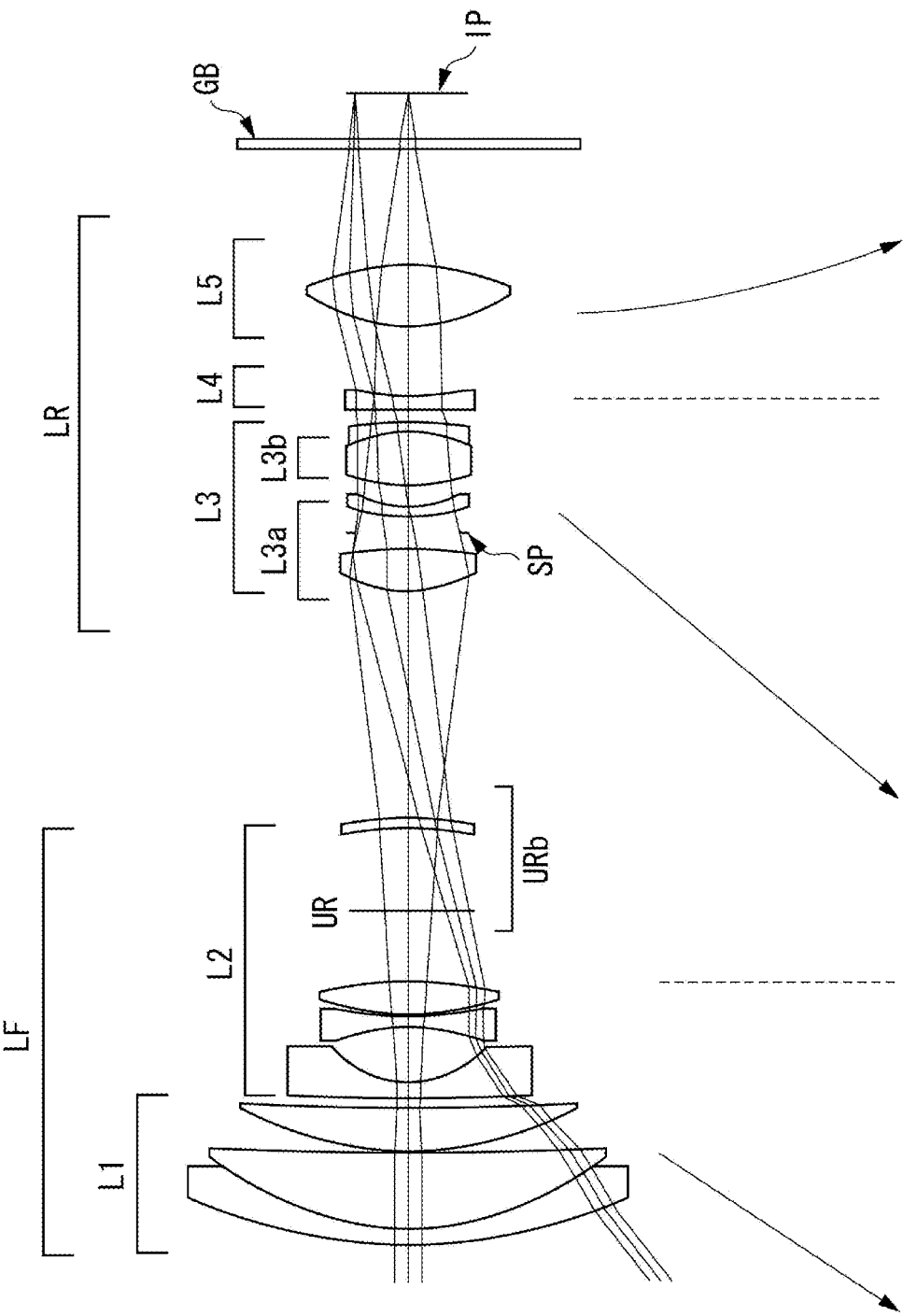
FIG. 9 is a sectional view of a zoom lens according to a fifth exemplary embodiment of the invention with an optical path exploded.
Figure 10A:
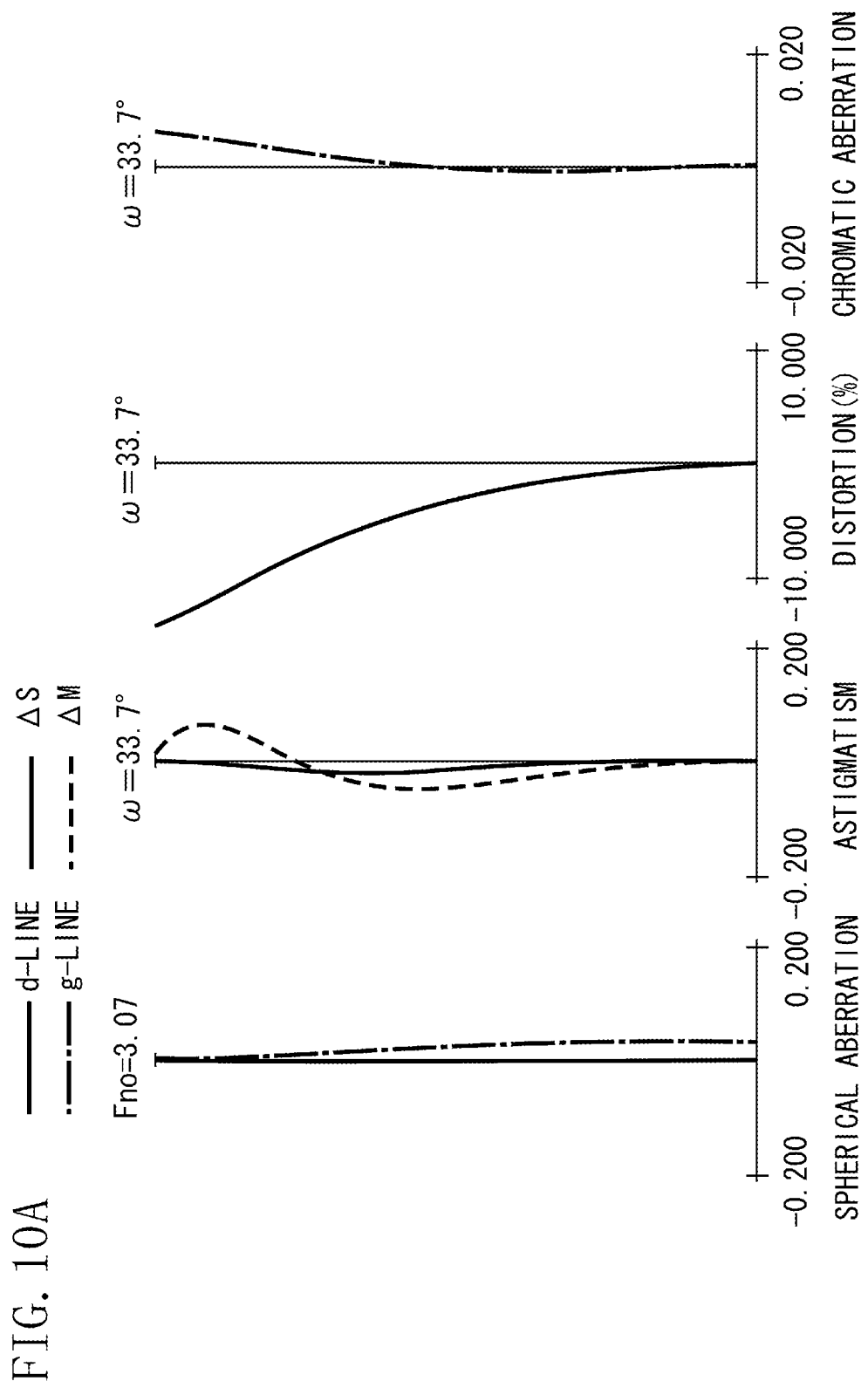
FIGS. 10A and 10B are aberration diagrams of the zoom lens at a wide-angle end and a telephoto end, respectively, according to the fifth exemplary embodiment of the invention.
Figure 10B:
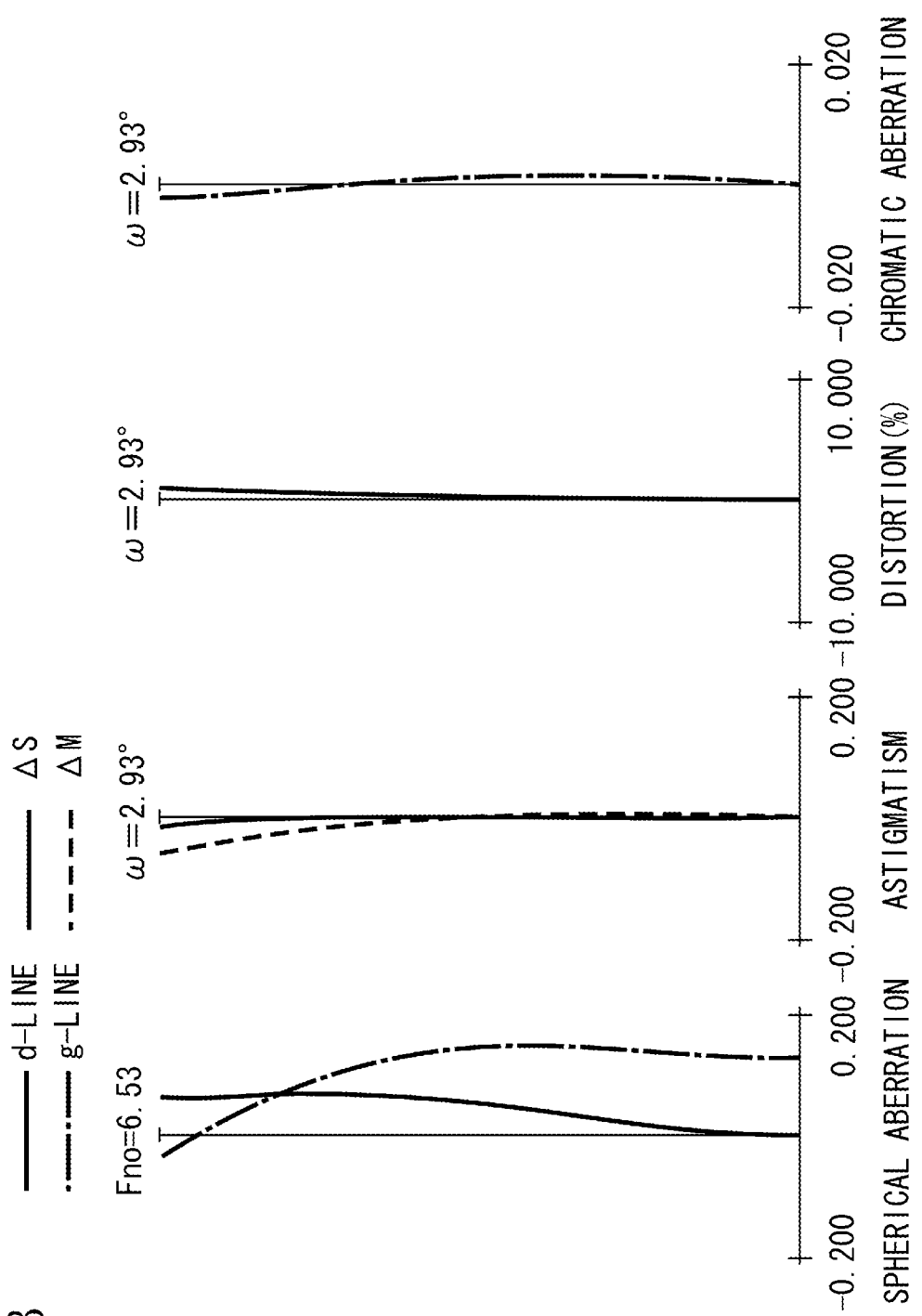
Figure 11A:
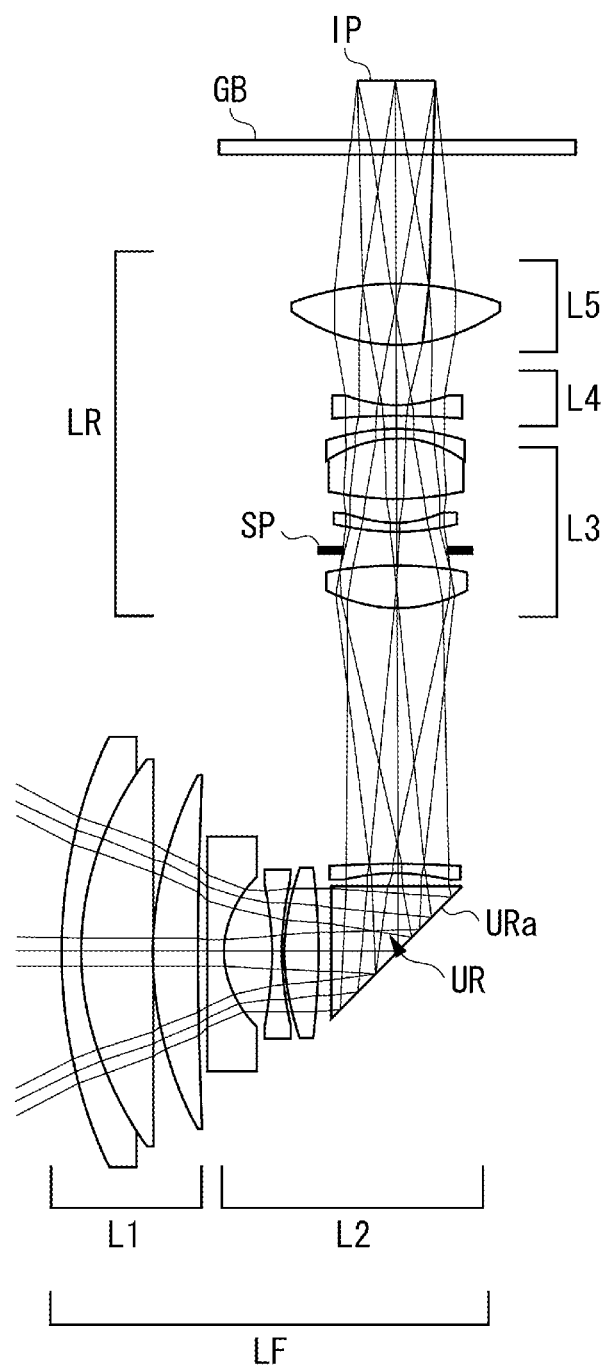
FIGS. 11A and 11B are sectional views illustrating the zoom lens in a photographing state and a non-photographing state, respectively, according to the first exemplary embodiment of the invention.
Figure 11B:
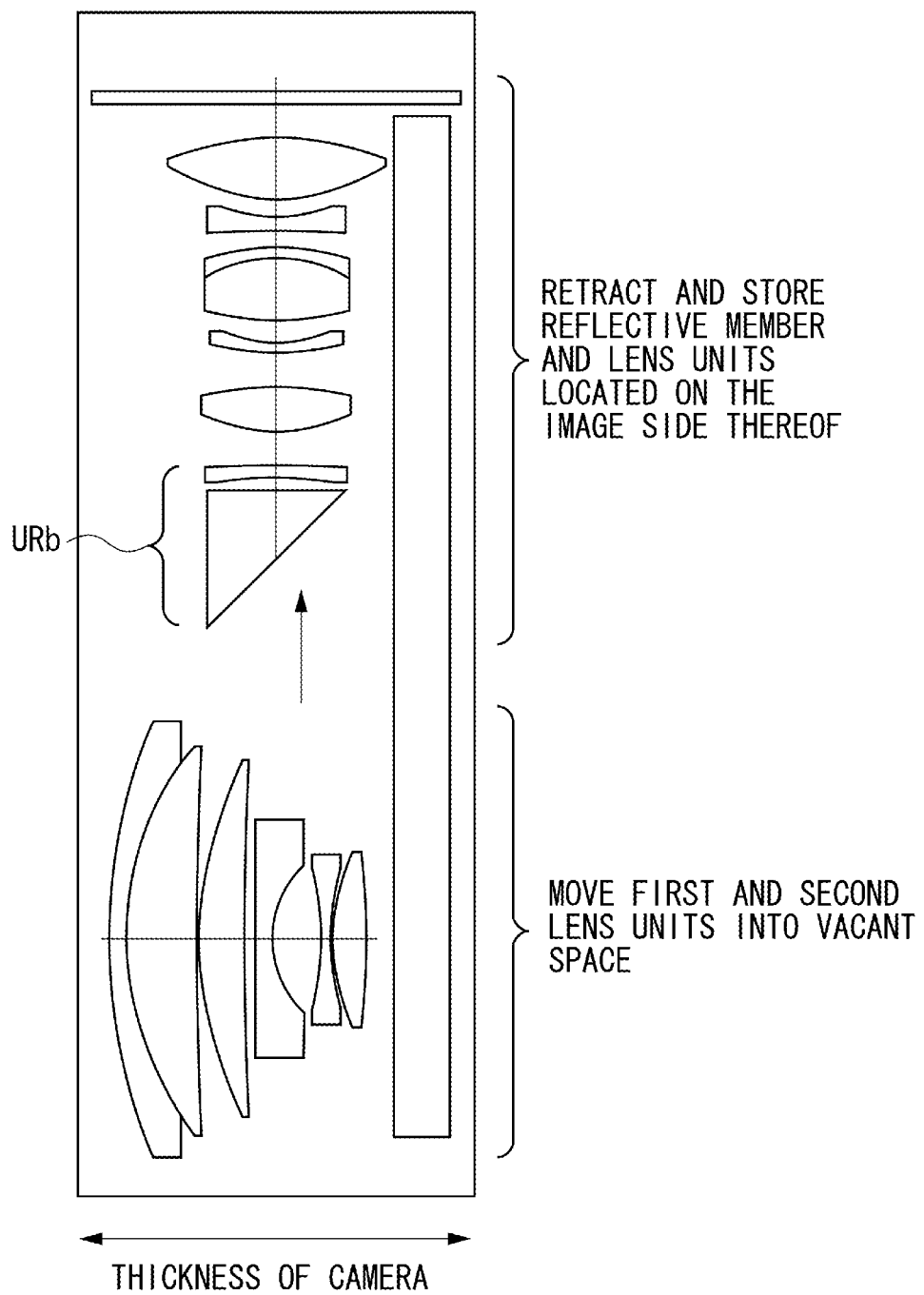
Figure 12:
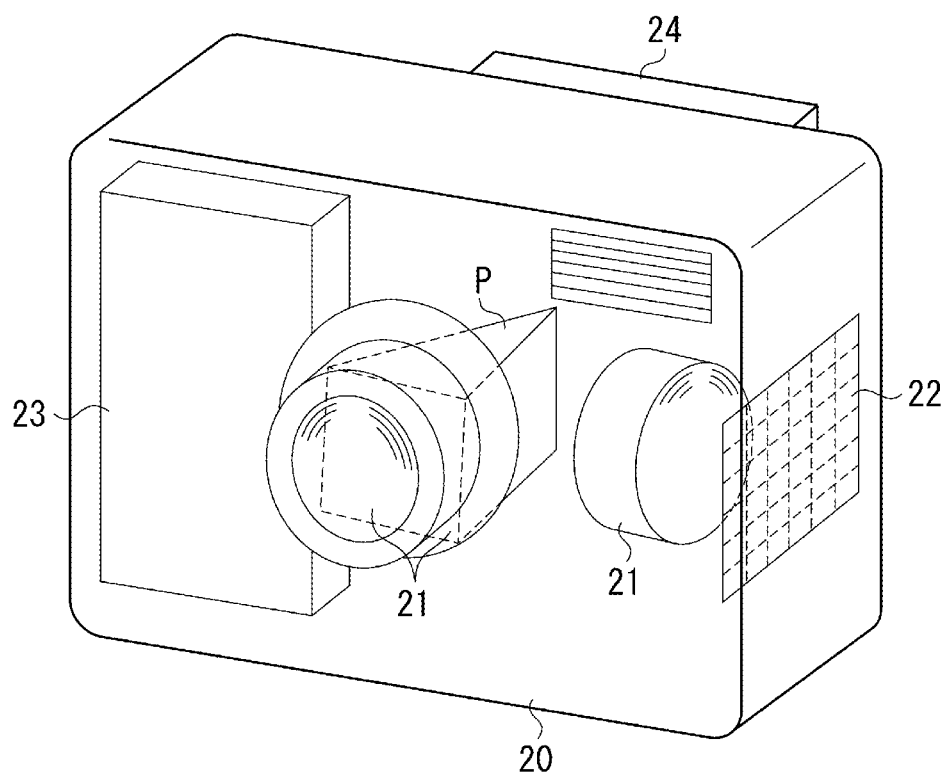
FIG. 12 is a schematic diagram illustrating principal components of an image pickup apparatus according to an exemplary embodiment of the invention.

FIG. 9 is a sectional lens view of a zoom lens according to a fifth exemplary embodiment of the invention at the wide-angle end with an optical path exploded. FIGS. 10A and 10B are aberration diagrams of the zoom lens according to the fifth exemplary embodiment of the invention at the wide-angle end and the telephoto end, respectively. FIGS. 11A and 11B are sectional lens views illustrating the zoom lens according to the first exemplary embodiment of the invention when an optical path is bent for photographing and when the zoom lens is stored (retracted) in the camera body. FIG. 12 is a schematic diagram illustrating principal components of a digital camera (an image pickup apparatus) equipped with the zoom lens according to an exemplary embodiment of the invention.

The zoom lens according to each exemplary embodiment is a photographic optical system used for an image pickup apparatus. In the sectional lens view with the optical path exploded, the left side corresponds to the object side (front) and the right side corresponds to the image side (rear). If the zoom lens according to the exemplary embodiment is used as a projection lens for a projector, for example, the left side corresponds to a screen and the right side corresponds to an image to be projected in the sectional lens view with the optical path exploded. In the sectional lens views, Li denotes the i-th lens unit, counted from the object side. A front lens group LF includes a first lens unit L1 and a second lens unit L2.

A rear lens group LR includes a plurality of lens units. The second lens unit L2 includes a reflective member UR, such as a reflecting prism or a reflection mirror, including a reflection surface that bends an optical path of the optical system at 90 degrees (or within 90±10 degrees). The sectional lens view also illustrates an aperture stop SP. An image plane IP is provided with a light-sensitive surface equivalent to an imaging plane for a solid-state image sensor (photoelectric conversion element), such as a charge-coupled device (CCD) sensor or a complementary metal-oxide semiconductor (CMOS) sensor if the zoom lens is used as a photographic optical system for a video camera or a digital still camera. Glass block GB represents a filter or a faceplate. Arrows indicate moving loci of the lens units during zooming from the wide-angle end to the telephoto end.

The zoom lens according to each exemplary embodiment keeps the second lens unit (and the reflective member included therein) stationary during zooming. The zoom lens moves at least three other lens units to ensure a specified zoom ratio.

The wide-angle end and the telephoto end correspond to the respective ends of a movable range of a zooming lens unit on the optical axis. The zooming lens unit is mechanically positioned at the wide-angle end and the telephoto end as zoom positions along the optical axis. The aberration diagram contains an F-number (Fno) graph. It also contains a half angle of view ω (degrees) graph. The spherical aberration diagram represents d-line and g-line. The astigmatism diagram represents a meridional image plane ΔM and a sagittal image plane ΔS of the d-line. Chromatic aberration of magnification (lateral chromatic aberration) is represented with the g-line.

With reference to FIGS. 11A and 11B, the following describes the retraction according to the first exemplary embodiment during photographing and during non-photographing. In FIG. 11A, the first lens unit L1 has positive refractive power (optical power=the reciprocal of a focal length). The second lens unit L2 has negative refractive power. The first lens unit L1 and the second lens unit L2 constitute the front lens group LF. The rear lens group LR includes a plurality of lens units. The rear lens group LR in FIG. 11A includes a third lens unit L3 having positive refractive power, a fourth lens unit L4 having negative refractive power, and a fifth lens unit L5 having positive refractive power.

The second lens unit L2 includes the reflective member UR (a prism according to the exemplary embodiment) that bends an optical path from the object side to the image side. The camera thickness (front-to-back direction) is thereby reduced. The reflective member UR as a prism is provided with reflection surface URa that bends an optical path of light entering from an object.

During storage (in a non-photographing state) as illustrated in FIG. 11B, the reflection unit URb including the reflective member UR and the lens as well as the third through fifth lens units (L3, L4 and L5) move perpendicularly to the optical axis of the front lens group LF including the first and second lens units L1 and L2, or move toward the image side in this example. Then, a part of the lens units located on the object side of the reflective member UR is stored in a space caused by movement of the reflection unit URb. The camera thickness is thereby further reduced.

The first lens unit L1 moves during zooming. Depending on movement conditions, the first lens unit L1 may require more retraction stages with regard to a lens barrel during retraction and non-photographing. For successful retraction, the lens barrel diameter may be increased to accordingly increase the camera width or height. In consideration of this, the first lens unit L1 needs to be designed so that the amount of zooming movement is reduced to fit into a specified range. In this case, the second lens unit L2 particularly needs to have an appropriately configured refractive power so that a small amount of movement can ensure an intended magnification ratio.

It is desirable to increase a magnification sharing ratio of the rear lens group LR so that a magnification sharing ratio of the lens unit located on the object side of the reflective member UR, such as the second lens unit L2, is made small. This can reduce the amount of zooming movement of the lens unit located on the object side and easily provides a zoom lens that can reduce the camera thickness and ensure a high zoom ratio. In this case, each exemplary embodiment satisfies the following condition:

$$12.0 < |ft/f2| < 30.0 \quad (1)$$

where f2 denotes the focal length of the second lens unit L2 and ft denotes the focal length of the entire zoom lens at the telephoto end.

The zoom lens according to each exemplary embodiment includes the first lens unit, the second lens unit, and the rear lens group in order from the object side to the image side. The second lens unit L2 including the reflective member UR does not move for zooming. The first lens unit L1 and at least two lens units of the rear lens group LR move during zooming to ensure a high zoom ratio.

The reflective member UR having the reflection surface for bending an optical path is included in the second lens unit L2. During retraction, the reflection unit URb of the reflective member UR moves almost perpendicularly to the optical axis of the front lens group LF. To reduce the camera thickness, a part of the lens units located on the object side of the reflective member UR is stored in a space caused by movement of the reflective member UR. According to the first exemplary embodiment, the reflection unit URb includes the reflective member UR and one lens. According to the second, third, and fourth exemplary embodiments, the reflection unit URb includes only the reflective member UR. According to the fifth exemplary embodiment, the reflection unit URb includes the reflective member UR and a lens.

Condition (1) specifies the focal length of the second lens unit L2. If the lower limit of condition (1) is exceeded, the second lens unit L2 has too weak a refractive power to ensure an intended zoom ratio. If the upper limit thereof is exceeded, the second lens unit L2 has too strong a refractive power to thin the camera. This is particularly because the edge of a negative lens is thickened. Condition (1a) below can be more usefully satisfied to easily provide a thinner camera.

$$12.0 < |ft/f2| < 20.0 \quad (1a)$$

As described above, each exemplary embodiment easily miniaturizes or thins a camera and ensures a high zoom ratio of a zoom lens.

Each exemplary embodiment can more usefully satisfy one or more of the following conditions. The amount of movement M1 is assumed for the first lens unit L1 and the length Lp is assumed in the optical axis direction for the reflective member UR during zooming from the wide-angle end to the telephoto end. If the reflective member is a mirror, however, Lp equals (the width of a reflection surface in the section containing the optical axes of the front lens group and the rear lens group)/√2. The last lens unit in the rear lens group LR, closest to the image side, has positive refractive power. Focal length fr is assumed for the last lens unit. Variable magnification ratios Z2 and Zr are assumed for the second lens unit L2 and the rear lens group LR, respectively, during zooming from the wide-angle end to the telephoto end.

Variable magnification ratio Z is expressed as follows:

$$Z = \beta t / \beta w$$

where βw and βt denote magnifications at the wide-angle end and the telephoto end, respectively.

The second lens unit L2 includes two or more negative lenses. Average refractive index N2n is assumed for materials of the negative lenses included in the second lens unit L2. Refractive index Np is assumed for a material of the reflective member UR. One or more of the following conditions can be satisfied.

$$1.50 < |M1|/Lp < 2.00 \quad (2)$$

$$0.100 < fr/ft < 0.600 \quad (3)$$

$$1.00 < Z2/Zr < 3.00 \quad (4)$$

$$1.85 < N2n < 2.00 \quad (5)$$

$$0.020 < (Lp/Np)/ft < 0.120 \quad (6)$$

The amount of movement M1 uses the negative sign if the first lens unit L1 moves from the object side to the image side. The following describes technical meanings of these conditions.

Condition (2) specifies the amount of movement of the first lens unit L1 during zooming from the wide-angle end to the telephoto end. If the lower limit of condition (2) is exceeded, an amount of movement of the first lens unit L1 is too small to ensure an intended zoom ratio. If the upper limit condition (2) is exceeded, the first lens unit L1 causes a large amount of movement and the lens barrel length increases to increase the camera thickness when the zoom lens is stored. Condition (2a) below can be more desirably satisfied to easily provide a thinner camera.

$$1.70 < |M1|/Lp < 1.90 \quad (2a)$$

Condition (3) specifies the ratio of the focal length of the last lens unit to the focal length of the entire zoom lens at the telephoto end. If the lower limit of condition (3) is exceeded, the refractive power of the last lens unit increases. As a result, the effective diameter of the last lens unit increases to increase the camera thickness. If the upper limit of condition (3) is exceeded, the rear lens group may not ensure a desired zoom ratio. The magnification sharing ratio of the lens units located on the object side of the reflective member and the amount of movement thereof during zooming increase. Then, the camera thickness increases. Condition (3a) below can be more desirably satisfied to easily provide a thinner camera.

$$0.150 < fr/ft < 0.250 \quad (3a)$$

Condition (4) specifies a relationship between the variable magnification ratio of the second lens unit L2 and the variable magnification ratio of the rear lens group LR. If the lower limit of condition (4) is exceeded, the second lens unit L2 allows too small a magnification sharing ratio. The camera width then increases. If the lower limit of condition (4) is exceeded, the second lens unit L2 allows too large a magnification sharing ratio. The camera thickness then hardly decreases. Condition (4a) below can be more desirably satisfied to easily provide a well-balanced compact camera.

$$1.00<Z2/Zr<2.20 \quad (4a)$$

In each exemplary embodiment, the second lens unit L2 requires a large refractive power. It is useful to use two or more negative lenses for the second lens unit L2.

Condition (5) specifies an average refractive index of materials of the negative lenses included in the second lens unit L2. If the lower limit of condition (5) is exceeded, the edge thickness of the negative lens increases. The camera thickness then increases. If the upper limit of condition (5) is exceeded, a highly dispersive material is generally used. Chromatic aberration is hardly corrected. As a result, the lens configuration is complicated to increase the camera size. Condition (5a) below can be more desirably satisfied to easily provide a more small-sized camera.

$$1.85<N2n<1.90 \quad (5a)$$

In each exemplary embodiment, the reflective member UR may be made of glass or resin and may be configured as a prism using internal reflection. The reflective member UR made of a material having a high refractive index can reduce the air-equivalent length of a space for placing the reflective member UR. Particularly, a front-lens effective diameter can be thereby reduced.

Condition (6) specifies the ratio of the air-equivalent length of a space for placing the reflective member UR to the focal length of the entire zoom lens at the telephoto end. If the lower limit of condition (6) is exceeded, it is difficult to ensure the space for placing the reflective member UR and to bend the optical path. This hampers miniaturization of the camera. If the lower limit of condition (6) is exceeded, the reflective member UR occupies too large a space. This also hampers miniaturization of the camera. Condition (6a) below can be more desirably satisfied to easily provide a thinner camera.

$$0.050<(Lp/Np)/ft<0.120 \quad (6a)$$

The following describes useful configurations other than the exemplary embodiments. The rear lens group LR may desirably contain a cutout on a lens periphery part of some lenses in the last lens unit closest to the image side. The last lens unit closest to the image side causes a large height of incidence for an off-axis beam and, therefore, increases a lens effective diameter. Increasing this lens diameter may hamper reducing the camera thickness. The camera thickness can be reduced, if needed, by providing a cutout for the region (lens periphery part) where no beam passes.

One lens unit of the rear lens group LR may desirably include a first lens subunit and a second lens subunit in order from the object side to the image side. The second lens subunit moves in such a way as to have a component perpendicular to the optical axis and thereby moves an image position. That is, the second lens subunit may be used for camera-shake correction. Depending on a zoom lens, the second lens unit L2 may include the reflective member UR. In such a zoom lens, the third lens unit L3 may approach the reflective member UR during zooming from the wide-angle end to the telephoto end.

In this case, the rear lens group LR is partly divided into partial lens units. The lens unit (lens component) at the image side moves in such a way as to have a component perpendicular to the optical axis. This facilitates camera-shake correction because the reflected optical path does not interfere with the lens unit at the telephoto end. The reflection unit URb including the reflective member UR may desirably move toward the image plane during transition from photographing to retraction.

The camera thickness may increase if the reflective member UR moves parallel to the optical axis of the first lens unit during transition from photographing to retraction. To solve this issue, the reflective member UR may be moved perpendicularly to the optical axis thereof. The space in the direction of the camera width or height can be effectively used if the reflective member UR can move toward the image plane. As a result, the camera size can be designed to be compacter.

The space for retracting and storing the reflective member UR may be insufficiently ensured because the rear lens group LR causes a small amount of movement during zooming, for example. In such a case, the reflective member UR may be moved in a direction opposite the image plane or may be moved perpendicularly to a plane including the optical axis of the optical path before and after it is bent. This can also reduce the camera thickness.

The following describes features of the lens structure in each exemplary embodiment.

The zoom lens according to the first exemplary embodiment includes, in order from the object side to the image side, the front lens group LF that includes the first lens unit L1 having positive refractive power and the second lens unit L2 having negative refractive power. The second lens unit L2 includes the reflective member UR. The zoom lens further includes the rear lens group LR that includes the third lens unit L3 having positive refractive power, the fourth lens unit L4 having negative refractive power, and the fifth lens unit L5 having positive refractive power. The reflective member UR uses a prism based on total reflection. The reflection unit URb includes the reflective member UR and one lens.

The second lens unit (and the reflective member UR included therein) and the fourth lens unit do not move during zooming from the wide-angle end to the telephoto end. The first lens unit L1 moves toward the object side and may move along a locus that is convex toward the image side. The third lens unit L3 moves toward the object side to perform variable magnification. The fifth lens unit moves toward the image side to correct a resulting image plane shift.

The zoom lens moves at least two lens units, the third and fifth lens units L3 and L5, in the rear lens group LR as well as the first lens unit L1 to ensure a high magnification of zoom ratio 15 even if the second lens unit L2 does not move. The fifth lens unit L5 adjusts focusing when the shooting distance changes.

The first exemplary embodiment specifies condition (2) to be as small as 1.862, that is, the ratio of the amount of movement of the first lens unit L1 to the thickness of the reflective member UR in the optical axis direction. In addition, the first exemplary embodiment specifies condition (1) to be 17.2, that is, the ratio of the focal length of the entire zoom lens at the telephoto end to the focal length of the second lens unit L2. This condition increases the refractive power of the second lens unit L2 to ensure a high zoom ratio and reduce the camera thickness.

The first exemplary embodiment specifies condition (3) to be 0.178, that is, the ratio of the focal length of the last lens unit to the focal length of the entire zoom lens at the telephoto end. This condition increases the refractive power of the last lens unit (fifth lens unit L5). The first exemplary embodiment specifies condition (4) to be as small as 1.24, that is, the magnification sharing ratio of the lens unit at the object side. This condition decreases the amount of movement of the first lens unit L1 during zooming. The second lens unit L2 has strong refractive power. The first exemplary embodiment specifies condition (5) to be as large as 1.87, that is, the average refractive index of materials of the negative lenses included in the second lens unit L2.

According to the first exemplary embodiment, a cemented lens portion (a lens subunit L3b) of the third lens unit L3 performs camera-shake correction.

The zoom lens according to the second exemplary embodiment is similar to that according to the first exemplary embodiment in terms of the refractive power configuration, the zoom type, and the focusing. The second exemplary embodiment uses a zoom ratio of 12.8. According to the second exemplary embodiment, the reflection unit URb includes only the reflective member UR. The second exemplary embodiment uses no stationary lens during zooming at the image side of the reflective member UR included in the second lens unit L2.

The second exemplary embodiment specifies condition (2) as small as 1.862, that is, the ratio of the amount of movement of the first lens unit L1 to the thickness of the reflective member UR in the optical axis direction. In addition, the second exemplary embodiment specifies condition (1) to be 12.1, that is, the ratio of the focal length of the entire zoom lens at the telephoto end to the focal length of the second lens unit L2. This condition increases the refractive power of the second lens unit L2 to ensure a high zoom ratio and reduce the camera thickness.

The second exemplary embodiment specifies condition (3) to be 0.211, that is, the ratio of the focal length of the last lens unit to the focal length of the entire zoom lens at the telephoto end. This condition increases the refractive power of the last lens unit (fifth lens unit L5). The second exemplary embodiment specifies condition (4) to be as small as 1.36, that is, the magnification sharing ratio of the lens unit at the object side. This condition decreases the amount of movement of the first lens unit L1 during zooming. The second lens unit L2 has strong refractive power. The second exemplary embodiment specifies condition (5) to be as large as 1.87, that is, the average refractive index of materials of the negative lenses included in the second lens unit L2.

According to the second exemplary embodiment, a cemented lens portion (a lens subunit L3b) of the third lens unit L3 performs camera-shake correction. The other contents are similar to the first exemplary embodiment.

The zoom lens according to the third exemplary embodiment includes the front lens group LF that includes the first lens unit L1 having positive refractive power and the second lens unit L2 having negative refractive power in order from the object side to the image side. The second lens unit L2 includes the reflective member UR. The zoom lens further includes the rear lens group LR that includes the third lens unit L3 having positive refractive power and the fourth lens unit L4 having positive refractive power. The reflective member UR uses a prism based on total reflection. The reflection unit URb includes only the reflective member UR.

The second lens unit (and the reflective member UR included therein) does not move during zooming from the wide-angle end to the telephoto end. The first lens unit L1 moves toward the object side and may move along a locus that is convex toward the image side. The third lens unit L3 moves toward the object side to perform variable magnification. The fourth lens unit moves along a locus that is convex toward the object side to correct a resulting image plane shift.

The zoom lens moves at least two lens units, the third and fourth lens units L3 and L4, in the rear lens group LR as well as the first lens unit L1 to ensure a high magnification of zoom ratio 13 even if the second lens unit does not move. The fourth lens unit L4 adjusts focusing when the shooting distance changes.

The third exemplary embodiment specifies condition (2) to be as small as 1.873, that is, the ratio of the amount of movement of the first lens unit L1 to the thickness of the reflective member UR in the optical axis direction. In addition, the third exemplary embodiment specifies condition (1) to be 12.4, that is, the ratio of the focal length of the entire zoom lens at the telephoto end to the focal length of the second lens unit L2. This condition increases the refractive power of the second lens unit L2 to ensure a high zoom ratio and reduce the camera thickness.

The exemplary embodiment specifies condition (3) to be 0.582, that is, the ratio of the focal length of the last lens unit to the focal length of the entire zoom lens at the telephoto end. This condition increases the refractive power of the last lens unit (fourth lens unit L4). The exemplary embodiment specifies condition (4) to be as small as 1.92, that is, the magnification sharing ratio of the lens unit at the object side. This condition decreases the amount of movement of the first lens unit L1 during zooming.

The second lens unit L2 has strong refractive power. The third exemplary embodiment specifies condition (5) to be as large as 1.87, that is, the average refractive index of materials of the negative lenses included in the second lens unit L2. According to the third exemplary embodiment, a cemented lens portion (a lens subunit L3b) of the third lens unit L3 performs camera-shake correction. The other contents are similar to the first exemplary embodiment.

The zoom lens according to the fourth exemplary embodiment includes the front lens group LF that includes the first lens unit L1 having positive refractive power and the second lens unit L2 having negative refractive power in order from the object side to the image side. The second lens unit L2 includes the reflective member UR. The zoom lens further includes the rear lens group LR that includes the third lens unit L3 having negative refractive power, the fourth lens unit L4 having positive refractive power, the fifth lens unit L5 having negative refractive power, and a sixth lens unit L6 having positive refractive power. The reflective member UR uses a prism based on total reflection. The reflection unit URb includes only the reflective member UR.

The second lens unit L4 (and the reflective member UR included therein) and the fifth lens unit L5 do not move during zooming from the wide-angle end to the telephoto end. The first lens unit L1 moves toward the object side and may move along a locus that is convex toward the image side. The fourth lens unit L4 moves toward the object side to perform variable magnification. The sixth lens unit L6 move along a locus that is convex toward the object side to correct a resulting image plane shift.

The zoom lens moves at least two of the third, fourth, and sixth lens units in the rear lens group as well as the first lens unit L1 to ensure a high magnification of zoom ratio 15 even if the second lens unit L2 does not move. The sixth lens unit L6 adjusts focusing when the shooting distance changes.

The fourth exemplary embodiment specifies condition (2) to be as small as 1.864, that is, the ratio of the amount of movement of the first lens unit L1 to the thickness of the reflective member UR in the optical axis direction. In addition, the fourth exemplary embodiment specifies condition (1) to be 12.5, that is, the ratio of the focal length of the entire zoom lens at the telephoto end to the focal length of the second lens unit L2. This condition increases the refractive power of the second lens unit L2 to ensure a high zoom ratio and reduce the camera thickness.

The fourth exemplary embodiment specifies condition (3) to be 0.191, that is, the ratio of the focal length of the last lens unit to the focal length of the entire zoom lens at the telephoto end. This condition increases the refractive power of the last lens unit (sixth lens unit L6). The fourth exemplary embodiment specifies condition (4) to be as small as 1.98, that is, the magnification sharing ratio of the lens unit at the object side. This condition decreases the amount of movement of the first lens unit L1 during zooming.

The second lens unit L2 has strong refractive power. The fourth exemplary embodiment specifies condition (5) to be as large as 1.87, that is, the average refractive index of materials of the negative lenses included in the second lens unit L2. According to the fourth exemplary embodiment, a cemented lens portion (a lens subunit L4b) of the fourth lens unit L4 performs camera-shake correction. The other contents are similar to the first exemplary embodiment.

The zoom lens according to the fifth exemplary embodiment is similar to that according to the first exemplary embodiment in terms of the refractive power configuration, the zoom type, and the focusing. The fifth exemplary embodiment uses a reflection mirror as the reflective member UR. The reflection unit URb includes the reflection mirror and the negative lens.

If the reflection mirror according to the fifth exemplary embodiment is used, the optical path is bent approximately at 90 degrees. The reflective member using the prism shows a characteristic value equivalent to the length Lp calculated as 8 mm. The calculation is based on $11.3/\sqrt{2}$ using the reflection surface length of 11.3 mm in the longitudinal direction The second lens unit L2 (and the reflective member UR included therein) and the fourth lens unit L4 do not move during zooming from the wide-angle end to the telephoto end. The first lens unit L1 moves toward the object side and may move along a locus that is convex toward the image side. The third lens unit L3 moves toward the object side to perform variable magnification. The fifth lens unit L5 moves to correct a resulting image plane shift.

The zoom lens moves at least two lens units, the third and fifth lens units L3 and L5, in the rear lens group LR as well as the first lens unit L1 to ensure a high magnification of zoom ratio 13 even if the second lens unit does not move. The fifth lens unit L5 adjusts focusing when the shooting distance changes.

The fifth exemplary embodiment specifies condition (2) to be as small as 1.860, that is, the ratio of the amount of movement of the first lens unit L1 to the thickness of the reflective member UR in the optical axis direction. In addition, the fifth exemplary embodiment specifies condition (1) to be 14.5, that is, the ratio of the focal length of the entire zoom lens at the telephoto end to the focal length of the second lens unit L2. This condition increases the refractive power of the second lens unit L2 to ensure a high zoom ratio and reduce the camera thickness.

The fifth exemplary embodiment specifies condition (3) to be 0.210, that is, the ratio of the focal length of the last lens unit to the focal length of the entire zoom lens at the telephoto end. This condition increases the refractive power of the last lens unit (fifth lens unit L5). The fifth exemplary embodiment specifies condition (4) to be as small as 1.34, that is, the magnification sharing ratio of the lens unit at the object side. This condition decreases the amount of movement of the first lens unit L1 during zooming. As described above, the second lens unit L2 has strong refractive power. The fifth exemplary embodiment specifies condition (5) to be as large as 1.87, that is, the average refractive index of materials of the negative lenses included in the second lens unit L2.

According to the fifth exemplary embodiment, a cemented lens portion (a lens subunit L3b) of the third lens unit L3 performs camera-shake correction.

All of the first through fifth exemplary embodiments may control the aperture stop diameter to reduce variations of the F-value during zooming. The zoom lens may be combined with an image pickup apparatus equipped with an image sensor that converts an optical image formed on the light-receiving surface into an electric signal. In such a case, the amount of distortion may be electrically corrected.

With reference to FIG. 12, the following describes an exemplary embodiment of a digital camera (optical apparatus) that uses a zoom lens according to any one of the exemplary embodiments of the invention as a photographic optical system. FIG. 12 illustrates a digital camera body 20 and a photographic optical system 21 including the zoom lens according to the exemplary embodiment. The zoom lens includes a reflective member P. The photographic optical system 21 forms an image of an object on a solid-state image sensor (photoelectric conversion element) 22 such as a CCD sensor. A recording unit 23 records the object image received by the image sensor 22. A user can use a viewfinder 24 to observe an image displayed on a display element (not illustrated). The display element includes a liquid crystal panel and displays an image formed on the image sensor 22.

The zoom lens according to the exemplary embodiment of the invention can be applied to a digital camera to provide a compact image pickup apparatus having high optical performance. The zoom lens according to the exemplary embodiment of the invention can be also applied to a mirrorless single-lens reflex camera.

The following describes numerical examples 1 to 5 corresponding to the first through fifth exemplary embodiments of the invention. In the numerical examples 1 to 5, the i-th surface is sequentially counted from the object side. The radius of curvature ri is assumed for the lens surface. Lens thickness or air distance di is assumed between the i-th surface and the (i+1)th surface. Refractive index ndi and Abbe number vdi are assumed for the d-line. Reflective members r12 and r13 are assumed for the numerical examples 1 to 4. The numerical example 3 uses dummy surfaces r14 and r15 for a design purpose. The numerical example 5 uses a reflective member (reflection mirror) r12. Each numerical example uses a glass block for the two last surfaces.

Aspheric coefficients k, A4, A6, A8, and A10 are assumed. The following equation defines a displacement x in the optical axis direction at a height h from the optical axis of an aspheric shape with reference to the surface vertex. $x=(h^2/R)/[1+\{1-(1+k)(h/R)^2\}^{1/2}]+A4h^4+A6h^6+A8h^8+A10h^{10}$ where R denotes the radius of curvature. In each aspheric coefficient, e-x denotes $10^{-x}$. Table 1 shows a relationship between each condition and each numerical example.

NUMERICAL EXAMPLE 1

Unit mm

Surface data

| Surface number | r | d | nd | vd | Effective diameter |
|---|---|---|---|---|---|
| 1 | 32.520 | 1.10 | 1.84666 | 23.8 | 24.00 |
| 2 | 18.752 | 4.31 | 1.49700 | 81.5 | 21.48 |
| 3 | 204.469 | 0.10 | | | 20.30 |
| 4 | 22.050 | 2.72 | 1.77250 | 49.6 | 19.67 |
| 5 | 139.023 | (variable) | | | 19.24 |
| 6 | −660.316 | 1.05 | 1.85135 | 40.1 | 12.78 |
| 7* | 6.025 | 3.00 | | | 9.11 |
| 8 | −17.819 | 0.60 | 1.88300 | 40.8 | 8.93 |
| 9 | 17.409 | 0.10 | | | 8.94 |
| 10 | 13.017 | 2.04 | 1.94595 | 18.0 | 9.13 |
| 11 | −38.886 | 0.80 | | | 9.03 |
| 12 | ∞ | 8.00 | 1.83400 | 37.2 | 8.57 |
| 13 | ∞ | 0.84 | | | 7.13 |
| 14 | −18.364 | 0.60 | 1.88300 | 40.8 | 7.00 |
| 15 | −60.216 | (variable) | | | 7.05 |
| 16* | 9.059 | 2.61 | 1.55332 | 71.7 | 7.56 |
| 17* | −25.480 | 1.00 | | | 7.20 |
| 18(stop) | ∞ | 1.00 | | | 6.57 |
| 19 | 13.906 | 0.60 | 1.84666 | 23.8 | 6.66 |
| 20 | 8.221 | 1.37 | | | 6.49 |
| 21 | 15.337 | 3.68 | 1.54072 | 47.2 | 7.22 |
| 22 | −7.520 | 0.60 | 1.80610 | 33.3 | 7.25 |
| 23 | −14.518 | (variable) | | | 7.43 |
| 24 | −62.970 | 0.70 | 1.77250 | 49.6 | 6.86 |
| 25 | 10.426 | (variable) | | | 6.90 |
| 26* | 10.473 | 3.64 | 1.48749 | 70.2 | 11.40 |
| 27 | −16.978 | (variable) | | | 11.40 |
| 28 | ∞ | 0.80 | 1.51633 | 64.1 | 20.00 |
| 29 | ∞ | 3.59 | | | 20.00 |
| Image plane | ∞ | | | | |

Aspheric data

Seventh surface

K = −6.21059e−002  A4 = 6.07506e−006  A6 = −3.47030e−006
A8 = 2.38225e−008  A10 = 6.59620e−009

16th surface

K = −4.02932e−001  A4 = −9.69640e−005  A6 = 1.87467e−007
A8 = −9.36504e−009

17th surface

K = 4.81084e+000  A4 = 1.42165e−004

26th surface

K = 0.00000e+000  A4 = −1.03025e−004  A6 = −3.33041e−007
A8 = −1.56813e−008

Various data
Zoom ratio 15.03

| | Wide-angle | Intermediate | Telephoto |
|---|---|---|---|
| Focal length | 5.18 | 24.84 | 77.83 |
| F-number | 3.07 | 5.10 | 6.75 |
| Angle of view | 33.66 | 7.91 | 2.54 |
| Image height | 3.45 | 3.45 | 3.45 |
| Total lens length | 73.49 | 82.38 | 88.34 |
| BF | 3.59 | 3.59 | 3.59 |
| d5 | 0.68 | 9.55 | 15.59 |
| d15 | 15.51 | 3.12 | 0.30 |
| d23 | 0.83 | 13.21 | 16.02 |
| d25 | 3.71 | 5.64 | 10.85 |
| d27 | 7.92 | 6.02 | 0.75 |
| Entrance pupil position | 15.95 | 46.95 | 120.92 |
| Exit pupil position | −38.46 | 1953.34 | 45.20 |
| Front principal point position | 20.49 | 72.10 | 344.33 |
| Rear principal point position | −1.58 | −21.25 | −74.25 |

Zoom lens unit data

| Lens unit | Beginning surface | Focal length | Lens configuration length | Front principal point position | Rear principal point position |
|---|---|---|---|---|---|
| 1 | 1 | 29.39 | 8.23 | 2.32 | −2.88 |
| 2 | 6 | −4.54 | 17.02 | 1.88 | −7.33 |
| 3 | 16 | 11.98 | 10.86 | 2.74 | −6.93 |
| 4 | 24 | −11.53 | 0.70 | 0.34 | −0.06 |
| 5 | 26 | 13.89 | 3.64 | 0.97 | −1.58 |
| GB | 28 | ∞ | 0.80 | 0.26 | −0.26 |

Single lens data

| Lens | Beginning surface | Focal length |
|---|---|---|
| 1 | 1 | −54.30 |
| 2 | 2 | 41.22 |
| 3 | 4 | 33.58 |
| 4 | 6 | −7.01 |
| 5 | 8 | −9.89 |
| 6 | 10 | 10.51 |
| 7 | 12 | 0.00 |
| 8 | 14 | −30.13 |
| 9 | 16 | 12.41 |
| 10 | 19 | −24.96 |
| 11 | 21 | 9.89 |
| 12 | 22 | −20.12 |
| 13 | 24 | −11.53 |
| 14 | 26 | 13.89 |
| 15 | 28 | 0.00 |

NUMERICAL EXAMPLE 2

Unit mm

Surface data

| Surface number | r | d | nd | vd | Effective diameter |
|---|---|---|---|---|---|
| 1 | 35.134 | 1.10 | 1.84666 | 23.8 | 23.99 |
| 2 | 21.087 | 4.24 | 1.49700 | 81.5 | 21.85 |
| 3 | −4957.011 | 0.10 | | | 20.67 |
| 4 | 20.999 | 2.69 | 1.71300 | 53.9 | 19.62 |
| 5 | 91.593 | (variable) | | | 19.17 |
| 6 | 76.557 | 1.05 | 1.85135 | 40.1 | 12.19 |
| 7* | 6.734 | 2.87 | | | 8.85 |
| 8 | −12.636 | 0.60 | 1.88300 | 40.8 | 8.37 |
| 9 | 10.638 | 0.42 | | | 8.16 |
| 10 | 11.910 | 1.81 | 1.94595 | 18.0 | 8.40 |
| 11 | −85.156 | 0.80 | | | 8.34 |
| 12 | ∞ | 8.00 | 1.83400 | 37.2 | 8.17 |
| 13 | ∞ | (variable) | | | 7.79 |
| 14* | 9.166 | 3.19 | 1.55332 | 71.7 | 7.43 |
| 15* | −80.894 | 1.00 | | | 6.72 |
| 16(stop) | ∞ | 1.00 | | | 6.26 |
| 17 | 11.303 | 0.60 | 1.84666 | 23.8 | 6.37 |
| 18 | 7.527 | 1.72 | | | 6.18 |
| 19 | 14.004 | 3.50 | 1.51742 | 52.4 | 6.86 |
| 20 | −8.773 | 0.60 | 1.80610 | 33.3 | 6.90 |

-continued

Unit mm

| | | | | | |
|---|---|---|---|---|---|
| 21 | −18.354 | (variable) | | | 7.08 |
| 22 | −44.473 | 0.70 | 1.77250 | 49.6 | 7.72 |
| 23 | 15.525 | (variable) | | | 7.85 |
| 24* | 10.526 | 4.04 | 1.48749 | 70.2 | 11.79 |
| 25 | −17.054 | (variable) | | | 11.73 |
| 26 | ∞ | 0.80 | 1.51633 | 64.1 | 20.00 |
| 27 | ∞ | 4.00 | | | 20.00 |
| Image plane | ∞ | | | | |

Aspheric data

Seventh surface

K = 1.42262e−001  A4 = −5.30387e−005  A6 = −3.49821e−006
A8 = −4.89416e−008  A10 = 1.11079e−008

14th surface

K = −1.73657e−001  A4 = −4.02661e−005  A6 = −1.12563e−006
A8 = 1.77782e−008

15th surface

K = 1.76223e+001  A4 = 7.94322e−005

24th surface

K = 0.00000e+000  A4 = −1.62823e−004  A6 = 5.73220e−008
A8 = −1.50667e−008

Various data
Zoom ratio 12.75

| | Wide-angle | Intermediate | Telephoto |
|---|---|---|---|
| Focal length | 5.20 | 23.36 | 66.35 |
| F-number | 3.07 | 4.94 | 6.35 |
| Angle of view | 33.54 | 8.40 | 2.98 |
| Image height | 3.45 | 3.45 | 3.45 |
| Total lens length | 73.54 | 82.61 | 88.34 |
| BF | 4.00 | 4.00 | 4.00 |
| d5 | 0.50 | 9.57 | 15.41 |
| d13 | 17.05 | 3.43 | 0.30 |
| d21 | 0.83 | 14.44 | 17.57 |
| d23 | 2.69 | 3.81 | 9.10 |
| d25 | 7.63 | 6.50 | 1.14 |
| Entrance pupil position | 15.78 | 46.85 | 112.92 |
| Exit pupil position | −34.42 | −672.93 | 46.50 |
| Front principal point position | 20.28 | 69.41 | 282.82 |
| Rear principal point position | −1.21 | −19.34 | −62.36 |

Zoom lens unit data

| Lens unit | Beginning surface | Focal length | Lens configuration length | Front principal point position | Rear principal point position |
|---|---|---|---|---|---|
| 1 | 1 | 29.81 | 8.13 | 2.17 | −3.00 |
| 2 | 6 | −5.49 | 15.55 | 1.21 | −9.06 |
| 3 | 14 | 14.15 | 11.61 | 2.53 | −7.63 |
| 4 | 22 | −14.82 | 0.70 | 0.29 | −0.10 |
| 5 | 24 | 14.03 | 4.04 | 1.09 | −1.77 |
| GB | 26 | ∞ | 0.80 | 0.26 | −0.26 |

Single lens data

| Lens | Beginning surface | Focal length |
|---|---|---|
| 1 | 1 | −64.62 |
| 2 | 2 | 42.26 |
| 3 | 4 | 37.62 |
| 4 | 6 | −8.73 |
| 5 | 8 | −6.46 |

-continued

Unit mm

| | | |
|---|---|---|
| 6 | 10 | 11.15 |
| 7 | 12 | 0.00 |
| 8 | 14 | 15.07 |
| 9 | 17 | −28.70 |
| 10 | 19 | 11.00 |
| 11 | 20 | −21.45 |
| 12 | 22 | −14.82 |
| 13 | 24 | 14.03 |
| 14 | 26 | 0.00 |

NUMERICAL EXAMPLE 3

Unit mm

Surface data

| Surface number | r | d | nd | vd | Effective diameter |
|---|---|---|---|---|---|
| 1 | 31.137 | 1.10 | 1.84666 | 23.8 | 24.04 |
| 2 | 19.417 | 4.63 | 1.49700 | 81.5 | 22.87 |
| 3 | 247.632 | 0.10 | | | 22.58 |
| 4 | 23.012 | 3.07 | 1.77250 | 49.6 | 21.85 |
| 5 | 127.368 | (variable) | | | 21.39 |
| 6 | 535.197 | 1.05 | 1.85135 | 40.1 | 11.91 |
| 7* | 5.725 | 2.95 | | | 8.38 |
| 8 | −12.888 | 0.60 | 1.88300 | 40.8 | 8.22 |
| 9 | 23.264 | 0.10 | | | 8.39 |
| 10 | 12.789 | 1.74 | 1.94595 | 18.0 | 8.66 |
| 11 | −184.479 | 0.80 | | | 8.61 |
| 12 | ∞ | 8.00 | 1.83400 | 37.2 | 8.51 |
| 13 | ∞ | 0.00 | | | 8.22 |
| 14 | ∞ | 0.00 | | | 8.22 |
| 15 | ∞ | (variable) | | | 8.22 |
| 16* | 7.338 | 2.62 | 1.51633 | 64.1 | 7.67 |
| 17* | −286.656 | 1.00 | | | 7.10 |
| 18(stop) | ∞ | 1.00 | | | 6.51 |
| 19 | 12.657 | 0.60 | 1.85026 | 32.3 | 6.51 |
| 20 | 6.713 | 1.45 | | | 6.26 |
| 21 | 13.577 | 3.57 | 1.51633 | 64.1 | 6.75 |
| 22 | −8.617 | 0.60 | 1.83400 | 37.2 | 7.01 |
| 23 | −17.316 | (variable) | | | 7.25 |
| 24* | 65.386 | 2.14 | 1.48749 | 70.2 | 9.62 |
| 25 | −27.466 | (variable) | | | 9.65 |
| 26 | ∞ | 0.80 | 1.51633 | 64.1 | 20.00 |
| 27 | ∞ | 2.17 | | | 20.00 |
| Image plane | ∞ | | | | |

Aspheric data

Seventh surface

K = 4.53349e−001  A4 = −2.99311e−005  A6 = −5.26233e−005
A8 = 4.33313e−006  A10 = −1.75089e−007

16th surface

K = −3.33003e−001  A4 = −7.12947e−005  A6 = −2.40686e−006
A8 = 4.24212e−008

17th surface

K = 8.94410e+002  A4 = 4.17550e−005

24th surface

K = 0.00000e+000  A4 = 3.66130e−005  A6 = 2.98180e−007
A8 = −4.38126e−009

-continued

Unit mm

Various data
Zoom ratio 13.00

|  | Wide-angle | Intermediate | Telephoto |
|---|---|---|---|
| Focal length | 5.28 | 24.95 | 68.70 |
| F-number | 3.07 | 4.42 | 5.52 |
| Angle of view | 33.14 | 7.87 | 2.88 |
| Image height | 3.45 | 3.45 | 3.45 |
| Total lens length | 73.37 | 83.40 | 88.22 |
| BF | 2.17 | 2.17 | 2.17 |
| d5 | 0.61 | 10.75 | 15.69 |
| d15 | 18.81 | 3.80 | 0.30 |
| d23 | 8.78 | 17.15 | 29.99 |
| d25 | 5.10 | 11.63 | 2.18 |
| Entrance pupil position | 16.42 | 57.36 | 129.38 |
| Exit pupil position | −32.61 | −74.69 | −530.59 |
| Front principal point position | 20.90 | 74.21 | 189.22 |
| Rear principal point position | −3.12 | −22.78 | −66.54 |

Zoom lens unit data

| Lens unit | Beginning surface | Focal length | Lens configuration length | Front principal point position | Rear principal point position |
|---|---|---|---|---|---|
| 1 | 1 | 29.23 | 8.90 | 2.27 | −3.36 |
| 2 | 6 | −5.56 | 15.24 | 0.85 | −9.11 |
| 3 | 16 | 15.87 | 10.84 | 1.34 | −7.97 |
| 4 | 24 | 39.98 | 2.14 | 1.02 | −0.43 |
| GB | 26 | ∞ | 0.80 | 0.26 | −0.26 |

Single lens data

| Lens | Beginning surface | Focal length |
|---|---|---|
| 1 | 1 | −63.67 |
| 2 | 2 | 42.11 |
| 3 | 4 | 35.90 |
| 4 | 6 | −6.80 |
| 5 | 8 | −9.32 |
| 6 | 10 | 12.70 |
| 7 | 12 | 0.00 |
| 8 | 16 | 13.90 |
| 9 | 19 | −17.63 |
| 10 | 21 | 10.80 |
| 11 | 22 | −21.23 |
| 12 | 24 | 39.98 |
| 13 | 26 | 0.00 |

NUMERICAL EXAMPLE 4

Unit mm

Surface data

| Surface number | r | d | nd | vd | Effective diameter |
|---|---|---|---|---|---|
| 1 | 33.988 | 1.10 | 1.84666 | 23.8 | 24.00 |
| 2 | 18.954 | 4.32 | 1.49700 | 81.5 | 21.44 |
| 3 | 276.484 | 0.10 |  |  | 21.12 |
| 4 | 19.958 | 3.05 | 1.77250 | 49.6 | 20.58 |
| 5 | 89.026 | (variable) |  |  | 20.13 |
| 6 | 87.941 | 1.05 | 1.85135 | 40.1 | 12.10 |
| 7* | 5.981 | 2.95 |  |  | 8.58 |
| 8 | −11.812 | 0.60 | 1.88300 | 40.8 | 8.30 |
| 9 | 13.923 | 0.10 |  |  | 8.31 |
| 10 | 12.756 | 1.96 | 1.94595 | 18.0 | 8.42 |
| 11 | −28.527 | 0.10 |  |  | 8.37 |
| 12 | ∞ | 8.00 | 1.83400 | 37.2 | 8.20 |
| 13 | ∞ | (variable) |  |  | 7.05 |
| 14 | −10.778 | 0.60 | 1.74400 | 44.8 | 6.93 |
| 15 | −17.122 | (variable) |  |  | 7.06 |
| 16* | 9.035 | 2.66 | 1.55332 | 71.7 | 7.56 |
| 17* | −21.218 | 1.00 |  |  | 7.15 |
| 18(stop) | ∞ | 1.00 |  |  | 6.37 |
| 19 | 11.057 | 0.60 | 1.84666 | 23.8 | 6.40 |
| 20 | 7.134 | 1.46 |  |  | 6.16 |
| 21 | 15.755 | 3.28 | 1.51742 | 52.4 | 6.67 |
| 22 | −10.085 | 0.60 | 1.80610 | 33.3 | 6.70 |
| 23 | −20.239 | (variable) |  |  | 6.83 |
| 24 | −30.962 | 0.70 | 1.77250 | 49.6 | 7.68 |
| 25 | 21.731 | (variable) |  |  | 7.87 |
| 26* | 11.447 | 3.37 | 1.48749 | 70.2 | 11.36 |
| 27 | −17.876 | (variable) |  |  | 11.33 |
| 28 | ∞ | 0.80 | 1.51633 | 64.1 | 20.00 |
| 29 | ∞ | 1.79 |  |  | 20.00 |
| Image plane | ∞ |  |  |  |  |

Aspheric data

Seventh surface $K = 3.07667e-001$  $A4 = -1.86268e-004$  $A6 = -1.07618e-005$
$A8 = 1.68517e-007$  $A10 = -1.24730e-008$ 16th surface $K = -4.59926e-001$  $A4 = -1.01592e-004$  $A6 = -7.23915e-007$
$A8 = -2.32649e-008$ 17th surface $K = 7.16199e+000$  $A4 = 1.91526e-004$ 26th surface $K = 0.00000e+000$  $A4 = -1.27346e-004$  $A6 = -2.39191e-007$
$A8 = -4.25156e-009$ Various data
Zoom ratio 15.03

|  | Wide-angle | Intermediate | Telephoto |
|---|---|---|---|
| Focal length | 5.18 | 22.15 | 77.84 |
| F-number | 3.07 | 4.72 | 6.58 |
| Angle of view | 33.66 | 8.85 | 2.54 |
| Image height | 3.45 | 3.45 | 3.45 |
| Total lens length | 72.84 | 81.26 | 87.73 |
| BF | 1.79 | 1.79 | 1.79 |
| d5 | 0.54 | 8.93 | 15.47 |
| d13 | 1.07 | 2.00 | 0.80 |
| d15 | 14.41 | 1.72 | 0.30 |
| d23 | 0.87 | 12.62 | 15.23 |
| d25 | 7.90 | 3.75 | 12.20 |
| d27 | 6.89 | 11.07 | 2.55 |
| Entrance pupil position | 15.83 | 44.79 | 129.15 |
| Exit pupil position | −216.46 | −169.35 | 39.11 |
| Front principal point position | 20.88 | 64.07 | 369.33 |
| Rear principal point position | −3.39 | −20.36 | −76.05 |

-continued

Unit mm

Zoom lens unit data

| Lens unit | Beginning surface | Focal length | Lens configuration length | Front principal point position | Rear principal point position |
|---|---|---|---|---|---|
| 1 | 1 | 28.89 | 8.57 | 2.26 | −3.11 |
| 2 | 6 | −6.23 | 14.76 | 0.73 | −8.88 |
| 3 | 14 | −40.75 | 0.60 | −0.61 | −0.97 |
| 4 | 16 | 12.08 | 10.60 | 1.77 | −7.24 |
| 5 | 24 | −16.43 | 0.70 | 0.23 | −0.16 |
| 6 | 26 | 14.87 | 3.37 | 0.92 | −1.43 |
| GB | 28 | ∞ | 0.80 | 0.26 | −0.26 |

Single lens data

| Lens | Beginning surface | Focal length |
|---|---|---|
| 1 | 1 | −52.37 |
| 2 | 2 | 40.72 |
| 3 | 4 | 32.67 |
| 4 | 6 | −7.58 |
| 5 | 8 | −7.16 |
| 6 | 10 | 9.54 |
| 7 | 12 | 0.00 |
| 8 | 14 | −40.75 |
| 9 | 16 | 11.82 |
| 10 | 19 | −25.54 |
| 11 | 21 | 12.42 |
| 12 | 22 | −25.61 |
| 13 | 24 | −16.43 |
| 14 | 26 | 14.87 |
| 15 | 28 | 0.00 |

NUMERICAL EXAMPLE 5

Unit mm

Surface data

| Surface number | r | d | nd | vd | Effective diameter |
|---|---|---|---|---|---|
| 1 | 33.379 | 1.10 | 1.84666 | 23.8 | 26.00 |
| 2 | 19.194 | 4.81 | 1.49700 | 81.5 | 23.31 |
| 3 | 194.668 | 0.10 | | | 22.12 |
| 4 | 21.494 | 2.71 | 1.77250 | 49.6 | 19.60 |
| 5 | 112.144 | (variable) | | | 19.17 |
| 6 | 174.420 | 1.05 | 1.85135 | 40.1 | 13.93 |
| 7* | 6.309 | 3.59 | | | 9.79 |
| 8 | −12.954 | 0.60 | 1.88300 | 40.8 | 9.58 |
| 9 | 22.255 | 0.13 | | | 9.78 |
| 10 | 17.073 | 2.21 | 1.94595 | 18.0 | 9.99 |
| 11 | −24.697 | 4.80 | | | 10.01 |
| 12 | ∞ | 4.90 | | | 12.02 |
| 13 | −16.950 | 0.60 | 1.88300 | 40.8 | 7.30 |
| 14 | −34.945 | (variable) | | | 7.38 |
| 15* | 8.155 | 2.70 | 1.55332 | 71.7 | 7.58 |
| 16* | −25.294 | 1.00 | | | 7.22 |
| 17(stop) | ∞ | 1.00 | | | 6.65 |
| 18 | 11.782 | 0.60 | 1.84666 | 23.8 | 6.58 |
| 19 | 6.687 | 1.47 | | | 6.28 |
| 20 | 12.671 | 3.40 | 1.58144 | 40.8 | 6.79 |
| 21 | −9.938 | 0.60 | 1.80610 | 33.3 | 6.67 |
| 22 | −37.106 | (variable) | | | 6.71 |
| 23 | −66.449 | 0.70 | 1.77250 | 49.6 | 7.07 |
| 24 | 12.330 | (variable) | | | 7.15 |
| 25* | 10.580 | 3.91 | 1.48749 | 70.2 | 11.51 |
| 26 | −17.280 | (variable) | | | 11.43 |
| 27 | ∞ | 0.80 | 1.51633 | 64.1 | 20.00 |
| 28 | ∞ | 2.80 | | | 20.00 |
| Image plane | ∞ | | | | |

Aspheric data

Seventh surface

K = 1.30253e−001  A4 = −1.01931e−004  A6 = −8.32531e−006
A8 = 2.65338e−007  A10 = −5.76512e−009

15th surface

K = −4.53654e−001  A4 = −1.16135e−004  A6 = −7.49732e−008
A8 = −1.33482e−008

16th surface

K = 4.34951e+000  A4 = 1.13151e−004

25th surface

K = 0.00000e+000  A4 = −1.02524e−004  A6 = −8.09230e−007
A8 = −2.07183e−009

Various data
Zoom ratio 13.00

| | Wide-angle | Intermediate | Telephoto |
|---|---|---|---|
| Focal length | 5.18 | 22.00 | 67.34 |
| F-number | 3.07 | 5.03 | 6.53 |
| Angle of view | 33.66 | 8.91 | 2.93 |
| Image height | 3.45 | 3.45 | 3.45 |
| Total lens length | 73.53 | 82.05 | 88.34 |
| BF | 2.80 | 2.80 | 2.80 |
| d5 | 0.62 | 9.17 | 15.51 |
| d14 | 14.56 | 2.95 | 0.30 |
| d22 | 0.83 | 12.45 | 15.10 |
| d24 | 4.56 | 5.39 | 10.23 |
| d26 | 7.37 | 6.53 | 1.64 |
| Entrance pupil position | 17.10 | 47.41 | 126.81 |
| Exit pupil position | −45.80 | 1506.08 | 47.03 |
| Front principal point position | 21.73 | 69.73 | 296.65 |
| Rear principal point position | −2.38 | −19.20 | −64.55 |

Zoom lens unit data

| Lens unit | Beginning surface | Focal length | Lens configuration length | Front principal point position | Rear principal point position |
|---|---|---|---|---|---|
| 1 | 1 | 30.04 | 8.72 | 2.54 | −3.00 |
| 2 | 6 | −4.65 | 17.88 | 2.19 | −10.22 |
| 3 | 15 | 12.51 | 10.77 | 0.86 | −7.68 |
| 4 | 23 | −13.41 | 0.70 | 0.33 | −0.06 |
| 5 | 25 | 14.11 | 3.91 | 1.05 | −1.71 |
| GB | 27 | ∞ | 0.80 | 0.26 | −0.26 |

Single lens data

| Lens | Beginning surface | Focal length |
|---|---|---|
| 1 | 1 | −55.31 |
| 2 | 2 | 42.46 |
| 3 | 4 | 33.98 |
| 4 | 6 | −7.71 |
| 5 | 8 | −9.20 |
| 6 | 10 | 10.95 |
| 7 | 13 | −37.87 |
| 8 | 15 | 11.48 |
| 9 | 18 | −19.31 |

-continued

Unit mm

| 10 | 20 | 10.14 |
|----|----|-------|
| 11 | 21 | −17.00 |
| 12 | 23 | −13.41 |
| 13 | 25 | 14.11 |
| 14 | 27 | 0.00 |

TABLE 1

| Numerical example | Condition | | | | | |
|---|---|---|---|---|---|---|
| | (1) | (2) | (3) | (4) | (5) | (6) |
| Numerical example 1 | 17.2 | 1.862 | 0.178 | 1.24 | 1.87 | 0.056 |
| Numerical example 2 | 12.1 | 1.862 | 0.211 | 1.36 | 1.87 | 0.066 |
| Numerical example 3 | 12.4 | 1.873 | 0.582 | 1.92 | 1.87 | 0.063 |
| Numerical example 4 | 12.5 | 1.864 | 0.191 | 1.98 | 1.87 | 0.056 |
| Numerical example 5 | 14.5 | 1.860 | 0.210 | 1.34 | 1.87 | 0.119 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-232757 filed Oct. 24, 2011, which is hereby incorporated by reference herein in its entirety.

What is claimed is:

1. A zoom lens comprising, in order from an object side to an image side:
   a front lens group including a first lens unit having positive refractive power and a second lens unit having negative refractive power; and
   a rear lens group including a plurality of lens units,
   wherein the second lens unit includes a reflective member configured to bend an optical path,
   wherein at least the first lens unit and at least two lens units of the rear lens group move during zooming,
   wherein the second lens unit does not move for zooming,
   wherein a reflection unit including the reflective member moves perpendicularly to an optical axis of the front lens group during retraction,
   wherein at least part of the front lens group is retractable into a space caused by the movement of the reflection unit, and
   wherein the following condition is satisfied:

$$12.0 < ft/|f2| < 30.0$$

where f2 denotes a focal length of the second lens unit, and ft denotes a focal length of the entire zoom lens at a telephoto end.

2. The zoom lens according to claim 1, wherein the following condition is satisfied:

$$1.50 < |M1|/4 < 2.00$$

where M1 denotes an amount of movement of the first lens unit during zooming from a wide-angle end to the telephoto end, and Lp denotes a length of the reflective member in an optical axis direction.

3. The zoom lens according to claim 1, wherein a last lens unit closest to the image side in the rear lens group has positive refractive power, and
   wherein the following condition is satisfied:

$$0.100 < fr/ft < 0.600$$

where fr denotes a focal length of the last lens unit.

4. The zoom lens according to claim 1, wherein the following condition is satisfied:

$$1.00 < Z2/Zr < 3.00$$

where Z2 and Zr denote variable magnification ratios of the second lens unit and the rear lens group, respectively, during zooming from a wide-angle end to the telephoto end.

5. The zoom lens according to claim 1, wherein the second lens unit includes at least two negative lenses, and wherein the following condition is satisfied:

$$1.85 < N2n < 2.00$$

where N2n denotes an average refractive index of materials of the negative lenses included in the second lens unit.

6. The zoom lens according to claim 1, wherein a last lens unit closest to the image side in the rear lens group includes a lens whose lens periphery part has a cutout.

7. The zoom lens according to claim 1, wherein one lens unit of the rear lens group includes, from the object side to the image side, a first lens subunit, and a second lens subunit that is movable to have a component perpendicular to an optical axis to move an image position.

8. The zoom lens according to claim 1, wherein the reflection unit moves toward the image side during retraction.

9. The zoom lens according to claim 1, wherein the rear lens group includes, in order from the object side to the image side, a third lens unit having positive refractive power, a fourth lens unit having negative refractive power, and a fifth lens unit having positive refractive power.

10. The zoom lens according to claim 1, wherein the rear lens group includes, in order from the object side to the image side, a third lens unit having negative refractive power, a fourth lens unit having positive refractive power, a fifth lens unit having negative refractive power, and a sixth lens unit having positive refractive power.

11. The zoom lens according to claim 1, wherein the rear lens group includes, in order from the object side to the image side, a third lens unit having positive refractive power and a fourth lens unit having positive refractive power.

12. An image pickup apparatus comprising:
   a zoom lens comprising, in order from an object side to an image side:
      a front lens group including a first lens unit having positive refractive power and a second lens unit having negative refractive power; and
      a rear lens group including a plurality of lens units,
      wherein the second lens unit includes a reflective member configured to bend an optical path,
      wherein at least the first lens unit and at least two lens units of the rear lens group move during zooming,
      wherein the second lens unit does not move for zooming,
      wherein a reflection unit including the reflective member moves perpendicularly to an optical axis of the front lens group during retraction,
      wherein at least part of the front lens group is retractable into a space caused by the movement of the reflection unit, and wherein the following condition is satisfied:

$$12.0 < ft/|f2| < 30.0$$

where f2 denotes a focal length of the second lens unit, and ft denotes a focal length of the entire zoom lens at a telephoto end; and a solid-state image sensor configured to receive an image formed by the zoom lens.

13. The zoom lens according to claim 1, wherein the reflective member includes a prism that is made of glass or resin and uses internal reflection.

14. The zoom lens according to claim 13, wherein the following condition is satisfied:

$$0.020 < (Lp/Np)/ft < 0.120$$

where Np denotes a refractive index of a material of the reflective member, and Lp denotes a length of the reflective member in an optical axis direction.

* * * * *